United States Patent [19]

Kimura et al.

[11] Patent Number: 4,874,053
[45] Date of Patent: Oct. 17, 1989

[54] TORQUE DETECTING APPARATUS

[75] Inventors: Hiroshi Kimura; Shotaro Naito, both of Katsuta; Kunio Miyashita, Hitachi; Yasuo Noto, Katsuta; Noboru Sugiura, Mito; Tadashi Takahashi, Hitachi; Hirohisa Yamamura, Hitachiota; Seizi Yamashita, Katsuta; Syooichi Kawamata, Hitachi; Fumio Tajima, Ibaraki; Shigeru Horikoshi, Mito, all of Japan

[73] Assignee: Hitachi, Ltd., Tokyo, Japan

[21] Appl. No.: 209,998

[22] Filed: Jun. 22, 1988

[30] Foreign Application Priority Data

| Jun. 22, 1987 | [JP] | Japan | 62-155061 |
| Oct. 9, 1987 | [JP] | Japan | 62-253692 |
| Oct. 9, 1987 | [JP] | Japan | 62-253693 |
| Oct. 9, 1987 | [JP] | Japan | 62-253694 |
| Oct. 21, 1987 | [JP] | Japan | 62-263930 |

[51] Int. Cl.⁴ .................................................. B62D 5/04
[52] U.S. Cl. ................................. 180/79.1; 74/388 PS
[58] Field of Search ............. 180/79.1, 141, 142; 74/388 PS

[56] References Cited

U.S. PATENT DOCUMENTS 4,437,531  3/1984  Urabe ............................... 180/79.1
4,550,597 11/1985  Drutchas et al. ................. 180/79.1

Primary Examiner—Kenneth R. Rice
Attorney, Agent, or Firm—Antonelli, Terry & Wands

[57] ABSTRACT

A device for detecting a load torque using angle detectors fitted with a certain spacing on a shaft which is rotated by a drive source and on the basis of a relative angular difference of angles detected by the angle detectors. The device includes two rotary drums or discs fitted with a certain spacing on the drive side and load side of the shaft, with a plurality of magnetic poles for generating magnetic signals being formed on the surface thereof, and a magnetic sensor disposed to confront the surface of the rotary drums or discs, with magnetic resistance effect elements which vary in internal resistance in response to the magnetism of the magnetic poles being provided thereon. The amount of torsion created by the load on the load side of the rotary shaft is measured as a phase difference of outputs of the magnetic sensor, and the torque is detected in terms of the angular difference between the magnetic drums or discs. The device is operative to detect a torque in both storage and rotation, and capable of detection within a period of magnetic signal, whereby high-accuracy, high-resolution torque detection is made possible.

35 Claims, 36 Drawing Sheets

CW ROTATION: $P_A$, $P_B$, $P_Z$

CCW ROTATION: $P_A$, $P_B$, $P_Z$ (A)

(B)

(A)

(B)

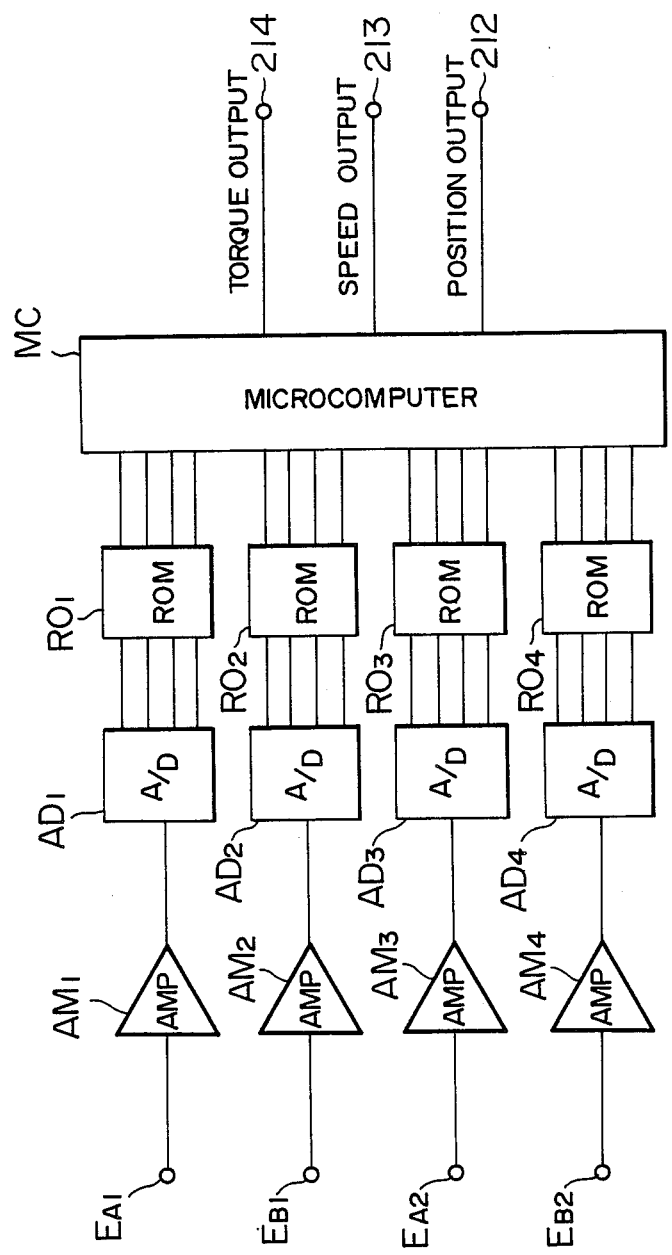

TORQUE DETECTING APPARATUS

BACKGROUND OF THE INVENTION

This invention relates to a torque detecting apparatus and, particularly, to a torque detecting apparatus which detects the torque from the torsion of a torsion bar. The invention is suitable for use with a torque assisting device including a steering force assisting system of a vehicle for example, and therefore the invention is not precluded from including the power steering system.

An example of a conventional torque measuring apparatus using a torsion bar is one invented by Parkinson, as described in Japanese Patent Publication No. 54-14949. Parkinson's torque detector includes a second gear (14) fitted directly on a shaft (13) and a first gear (11) fitted at the free end of a sleeve (12) which is secured to the shaft (13). The apparatus further includes a first magnetic transducer (16) and third magnetic transducer (17) for detecting teeth of the first gear and second magnetic transducer (17) and fourth magnetic transducer (20) for detecting teeth of the second gear, and operates to measure the torque from the torsion of shaft which is determined from the difference of rotational positions of the first and second gears detected by the sensors. However, it is not clear what kind of magnetic transducers are used in the Parkinson invention. The description that the magnetic transducers are coupled with the gears, and the associated FIG. 3 suggest the transducers to be of the electromagnetic pickup coil type.

Transducers of the electromagnetic pickup coil type have their output signals dependent in magnitude on revolutions of the gears. The transducer produces a smaller output when the gear rotates slowly, and conceivably it is not capable of detecting the torque when the gear rotates very slowly or is quiescent.

A torque measuring apparatus using a torsion bar is described in Japanese Utility Model Laid-Open No. 61-76338 by Yoneda. The apparatus includes two magnetic media (24, 25) fitted with a certain spacing on a torque transmission shaft (21), and their magnetic poles N and S are detected by magnetic resistance elements (28, 29). The magnetic resistance element has its internal resistance varied in response to the magnetic field, and is operative to detect magnetic poles even if the magnetic media are quiescent.

Although Yoneda's invention overcomes the problem of the above-mentioned Parkinson invention, it is designed to measure the torque through the computation of pulses derived from the signals of the magnetic resistance elements (28, 29) (refer to FIG. 1) and therefore it cannot measure the torque if pulses are not produced in a number suitable for computation. Specifically, it is infeasible to detect a small variation of torque occurring between contiguous pulses.

SUMMARY OF THE INVENTION

A primary object of this invention is to provide a torque detecting apparatus which uses magnetic resistance effect elements (will be termed "MR elements") and is operative to detect the torque in a speed range from stoppage to high-speed region continuously (in extremely small steps).

A secondary object of this invention is to provide a torque assisting system which suitably uses the above torque detecting apparatus.

A further object of this invention is to provide a practical method and structure for properly carrying out the above objects.

The present invention resides in a torque detecting apparatus which detects the load torque on the basis of a relative angular difference detected by angle detectors fitted in a certain interval on a shaft rotated by a drive source. The apparatus includes two rotary drums or rotary discs fitted with a certain spacing on the drive side and load side of the shaft. A plurality of magnetic poles for generating a magnetic signal are formed on the drum or disc surface, and a magnetic sensor is disposed to confront the drum or disc surface. The magnetic sensor includes magnetic resistance effect elements which vary in their internal resistance in response to the magnetism of the magnetic poles being provided on it. The amount of torsion of the rotary shaft at the load side created by the load torque is measured as a phase difference of the outputs of the magnetic sensor and is evaluated in terms of the angular difference between the magnetic drums or discs. The torque is detected from the angular difference.

BRIEF DESCRIPTION OF THE DRAWINGS

FIGS. 1 through 9 are diagrams showing the first embodiment of this invention, in which:
FIG. 1 is cross-sectional diagram of the torque detecting apparatus;
FIG. 2 is a brief perspective view of the first and second drums;
FIG. 3 is an enlarged plan view showing the state of magnetic signal on the first drum;
FIG. 4 is a diagram showing the disposition of MR elements of the magnetic sensor;
FIG. 5 is a connection diagram of the MR elements;
FIG. 6 is a schematic diagram of the output signal processing circuit;
FIGS. 7 and 8 are waveform diagrams; and
FIG. 9 is an illustration showing the torque assisting system.
FIGS. 10 through 16 are diagrams showing the second embodiment of this invention, in which:
FIG. 10 is an illustration showing the overall torque detecting apparatus;
FIG. 11 is a diagram showing the disposition of MR elements of the magnetic sensor;
FIG. 12 is a connection diagram of the MR elements;
FIG. 13 is a schematic diagram of the output signal processing circuit;
FIG. 14 is an output waveform diagram;
FIG. 15 is a schematic diagram of the differential voltage detecting circuit; and
FIG. 16 is a waveform diagram of the signal received by the differential voltage detecting circuit.
FIGS. 17 through 22 are diagrams showing the third embodiment of this invention, in which:
FIG. 17 is a cross-sectional view of the torque detecting apparatus;
FIG. 18 is a block diagram of the control unit;
FIG. 19 is a diagram of control characteristics;
FIG. 20 is a schematic diagram of the control unit;
FIG. 21 is a signal waveform diagram; and
FIG. 22 is a flowchart used to explain the operation.
FIGS. 23 through 33 are diagrams showing the fourth embodiment of the invention, in which:
FIG. 23 is an illustration showing the arrangement of the torque detecting apparatus embodying the invention;

FIG. 24 is a detailed diagram of the rotary drum and magnetic sensor which constitute the torque detecting apparatus;

FIG. 25 is a diagram showing by development the magnetic members and in plan view the magnetic sensor which confronts the magnetic members;

FIG. 26 is a diagram showing magnetic poles recorded on the magnetic members and the outputs of the sensors;

FIG. 27 is a connection diagram of the MR elements in 3-terminal configuration;

FIG. 30 is a characteristic graph of the inventive torque detecting apparatus;

FIG. 31 is a diagram showing the arrangement of one embodiment of the torque detecting apparatus in detecting the torque at stoppage;

FIG. 32 (A) is a graph showing the relation between the sensor output waveform and the carrier waveform;

FIG. 32 (B), is a diagram explaining the mode discrimination based on two magnetic sensor output signals; and FIG. 33 is an illustration showing the arrangement of another embodiment.

FIGS. 34 through 41 are diagrams showing the fifth embodiment of this invention, in which:

FIG. 34 is a brief perspective view of the torque detecting apparatus;

FIG. 35 is a cross-sectional view of the apparatus; and

FIGS. 36 through 41 are diagrams showing other structures of the apparatus of FIG. 34.

FIGS. 42 through 48 are diagrams showing the sixth embodiment of this invention, in which:

FIGS. 42, 44, 45 and 47 are diagrams showing the relation between the rotary drum and the magnetic sensor;

FIG. 43 is a signal waveform diagram; and

FIGS. 46 and 48 are waveform diagrams showing the output waveform relative to the magnetic signal on the rotary drum.

FIGS. 49 through 52 are diagrams showing the seventh embodiment of this invention, in which:

FIG. 49 is a block diagram of the circuit arrangement which employs a microcomputer;

FIG. 50 is a flowchart of torque computation;

FIG. 51 is a flowchart of speed detection and position detection; and

FIG. 52 is a diagram showing a technique of producing a sinusoidal signal waveform.

FIGS. 56 through 59 are diagrams showing the ninth embodiment of this invention, in which:

FIG. 56 is an output waveform relative to the magnetic signal on the rotary drum;

FIG. 57 is a connection diagram of the MR elements in 3-terminal configuration;

FIGS. 58(A) and 58(B) is an output waveform produced by the above connection; and FIG. 59 is a block diagram showing the circuit arrangement which employs a ROM device and a microcomputer.

DESCRIPTION OF THE PREFERRED EMBODIMENTS

Figure 1:
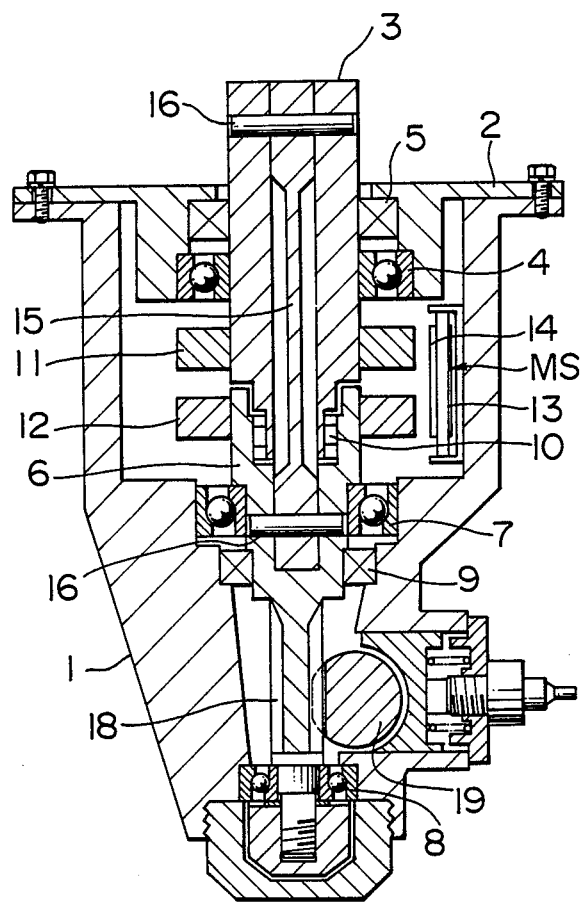

The invention will be described by taking two examples pertinent to the automobile steering system to which the inventive torque detecting apparatus is suitably applied.

Embodiment 1

The first embodiment will be described with reference to FIG. 1. In the figure, indicated by 1 is a gear box which is closed by a lid 2 at the top face. 3 is a driving shaft, such as a steering shaft, supported rotatably by the lid 2 through a bearing 4. 5 is an oil seal provided above the bearing 4, 6 is a driven shaft which is supported rotatably in the gear box 1 through bearings 7 and 8, and 9 is an oil seal for the driven shaft 6. The driving shaft 3 and driven shaft 6 are disposed so that their axes coincide accurately with each other on a line, as will be appreciated from the figure. The shafts 3 and 6 are prevented from having axis eccentricity or axis deflection through the provision of a coupling bearing 10. The coupling bearing 10 has its inner rim formed to receive a small-diameter cylinder section formed at the lower end of the driving shaft 3, while its outer rim is formed to couple with a large-diameter cylinder section formed at the upper end of the driven shaft 6. The coupling bearing 10 and small and large-diameter cylinder sections are machined very precisely so that the shaft alignment is maintained.

Indicated by 11 is a first drum fitted at the lower end of the driving shaft 3, and 12 is a second drum fitted at the upper end of the driven shaft 6. The drums 11 and 12 are made of non-magnetic material such as aluminum, and machined precisely to have exactly the same dimensions. The drums 11 and 12 are preferably disposed as close to each other as possible. The drums are provided on their circumferential surface with magnetic media, as will be described later, which are magnetized to be N and S alternately in a tens micron pitch. 13 is a substrate of a magnetic sensor (MS), and 14 are magnetic resistance effect elements (MR elements) formed by evaporative deposition or etching on the surface of the substrate 13.

Indicated by 15 is a torsion bar, which extends from the driving shaft 3 to the driven shaft 6, and is secured at both ends by pins 16 and 17. The driven shaft 6 has a formation of a pinion on its lower exterior surface so that it is coupled with a power assisting system, e.g., a motor rack 19. Fitted at the lower end of the driven shaft 6 is an output boss 20, which is connected to the steering mechanism (not shown).

It is assumed that an automobile has its wheel tires in contact with the road surface with a certain contact torque (frictional torque). When the steering wheel is turned, i.e., a torque is applied to the driving shaft 3, a torsion is created on the torsion bar in proportion to the applied torque, provided that the torque applied to the driving shaft 3 is smaller than the contact torque. From the rotational difference between the driving shaft 3 and driven shaft 6, i.e., a torsion of the torsion bar 15, the torque is detected. As the torque, i.e., the driver's operating force, to the driving shaft 3 is increased progressively, the amount of torsion of the torsion bar also increases and it reaches the critical point at which the frictional force is overcome. This critical point accounts for the magnitude of the contact torque, or in other words the magnitude of steering force required. When the operating force is further increased, the driving shaft 3 and driven shaft 6 rotate at the operating rotational speed, while the torsion bar 15 retains a certain maximum amount of torsion. In this state, the driving shaft 3 and driven shaft 6 are in rigid connection in appearance. If the maximum torque, i.e., the necessary operating force, is too large for the driver to deal with, an assisting drive unit is used so as to lower the driver's operating force.

Actually, the torque detection can be implemented through the detection of the amount of torsion on the torsion bar, and the torsion bar 15 is relatively thin so that it has a certain resilient force. A thin torsion bar has a small amount of torsion, i.e., amount of displacement, and it is difficult to detect its torsion directly. Therefore, the first drum 11 and second drum 12 are used for enlarging the amount of displacement, and accurate detection is made possible. The displacement angle is constant irrespective of the diameter.

In FIG. 1, when the driving shaft 3 is rotated, the first drum 11 rotates integrally with the driving shaft 3, and the driving force is transmitted through the torsion bar 15 to the driven shaft 6. The driven shaft 6 is coupled with a load, and the shaft 6 rotates while maintaining the amount of torsion in proportion to the load torque, i.e., with a certain lagging rotational angle. The driven shaft 6 is provided with the second drum 12, and by detecting the difference of rotational angles of the first drum 11 and second drum 12 using the MR elements 14, the torque is detected.

Figure 2:
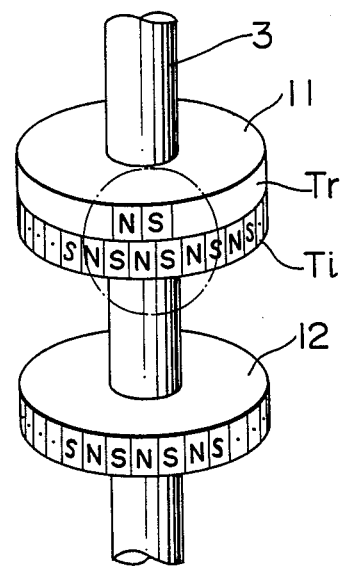
Figure 3:
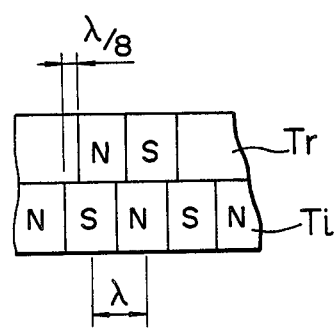

Next, the structure of the magnetic sensor and means of detecting the rotational angle and torque will be described. FIGS. 2 and 3 show the magnetized signals on the first drum 11 and second drum 12. The magnetized signals have a pitch of $\lambda$. The first drum 11 and second drum 12 are fitted in a coaxial fashion to the driving shaft 3. Magnetized on the circumferential surface of the first drum 11 are an incremental track Ti which is a series of signals formed of N and S poles and a reference track Tr which is a pair of reference signals shifted by a $\lambda/8$ pitch relative to the track Ti. The second drum 12 is provided on its circumferential surface with the magnetization of only the incremental track Ti. FIG. 3 is a partial enlarged view of the first drum 11, showing the $\lambda/8$ pitch shift between the incremental track Ti and reference track Tr.

Figure 4:
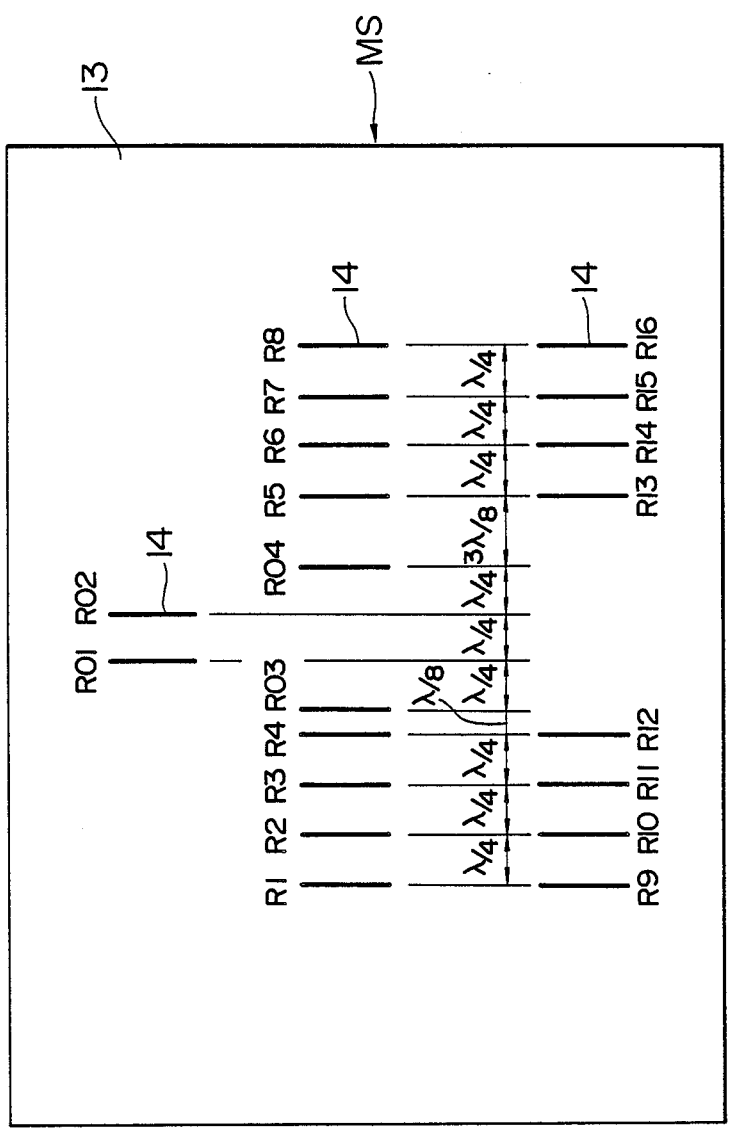

FIG. 4 shows the arrangement of MR elements 14 on the substrate 13 of magnetic sensor MS. The MR elements R01–R04, R1–R4, R5–R8, R9–R12, and R13–R16 are arranged with a spacing as shown in the figure for a magnetic recording pitch of $\lambda$. A group of MR elements including R01–R04 and R1–R8 is disposed in proximity to the circumferential surface of the first drum 11, while a group of MR elements including R9–R16 is disposed in proximity to the circumferential surface of the second drum 12.

Figure 5:
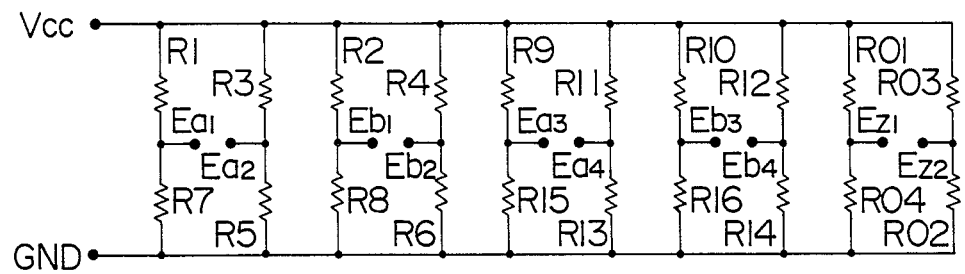

FIG. 5 shows the connection of the MR elements arranged as described above. As will be appreciated from the figure, five bridge circuits are formed, each made up of four MR elements. Indicated in the connection diagram by $E_{a1}$–$E_{a4}$, $E_{b1}$–$E_{b4}$, and $E_{z1}$ and $E_{z2}$ are 3-terminal output terminals each led out at the node of two series-connected MR elements, Vcc is a power voltage terminal, and GND is a ground terminal.

Figure 6:
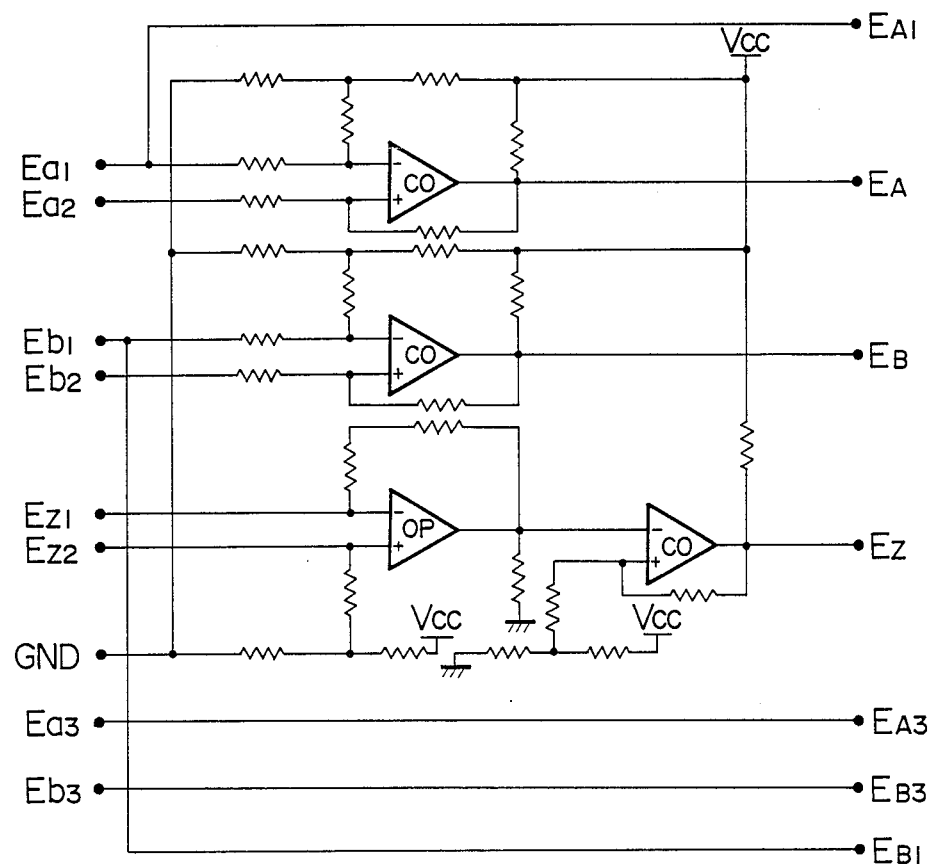
Figure 7:
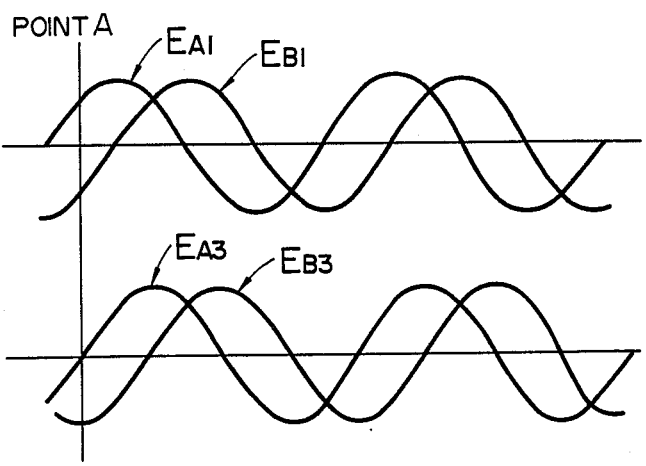
Figure 8:
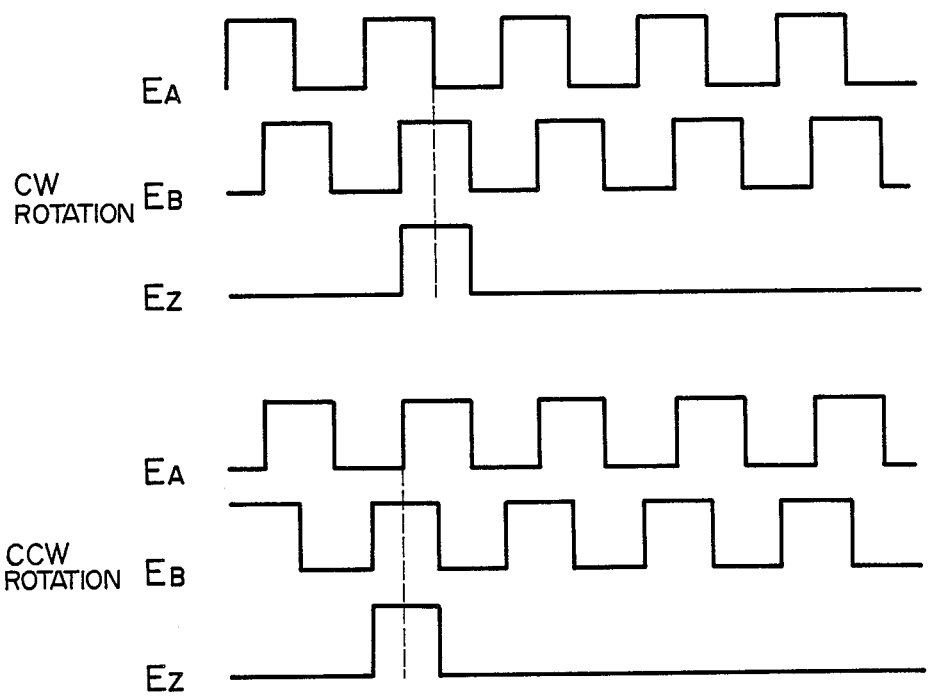

FIG. 6 shows a waveform processing circuit, which receives the outputs in FIG. 5 and produces the output waveforms shown in FIGS. 7 and 8. In FIG. 7, $E_{A1}$ and $E_{B1}$ are signals created by the first drum 11, and $E_{A3}$ and $E_{B3}$ are signals created by the second drum 12. Each pair of signals are sinusoidal waves out of phase with each other by an electrical angle of $\lambda/4$. The presence of a shift between the signals of the first drum and the signals of the second drum accounts for a torsion on the torsion bar 15, i.e., the driven shaft 6 is loaded.

In the presence of a load torque, if the phase difference of the signals $E_{A1}$ and $E_{A3}$ can be detected from their magnitudes at a time point A for example, the load torque (steering force) can be detected through the conversion from the detected phase difference. The circuit shown in FIG. 6 produces output signals shown in FIG. 8, and by counting the number of pulses at the rising or falling edges of the signal $E_A$ for example since the no-load initial state, the operating angle can be detected at the same time.

Figure 9:
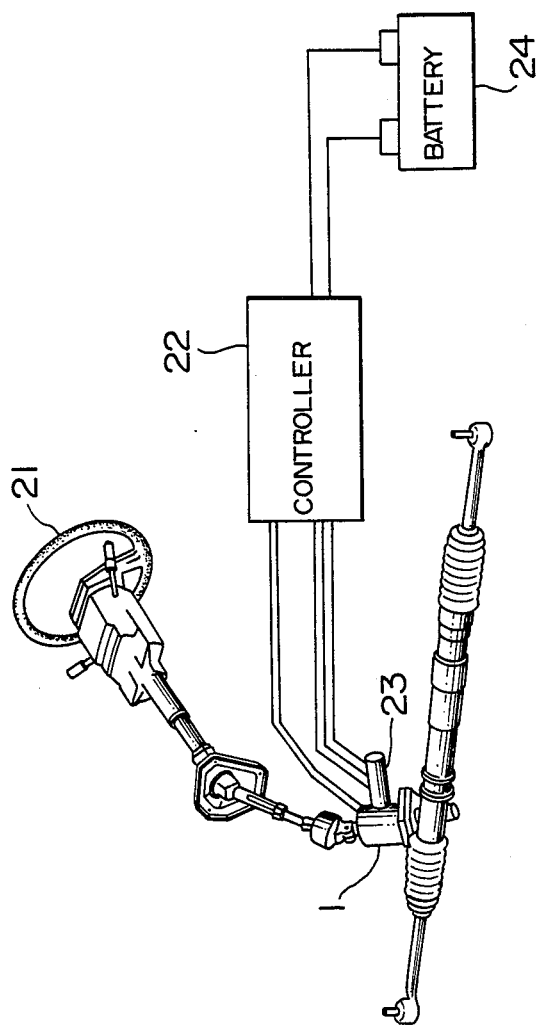

FIG. 9 shows an example of the torque assisting system, which is specifically the electric power steering system. The foregoing torque sensor is used to detect the torque (steering force) and rotational angle (steering angle) as the driver turns the steering wheel 21. The torque sensor is accommodated in the gear box 1, and its output signals are delivered to a controller 22. Upon receiving the signals, the controller 22 energizes a motor 23 using a battery 24 through the issuance of a command so that the operating force to the steering wheel 21 is assisted. This embodiment allows a compact integral structure for the magnetic sensor (MS) and two drums including the first drum 11 and second drum 12, and they can be accommodated in the gear box 1.

In this structure, the bearing 10 plays a crucial role in realizing a compact design and high-accuracy detection. Namely, the single bearing 10 couples the free ends of the driving shaft 3 and driven shaft 6, which enables accurate centering for the shafts. Even if an axis deflection exists, the shafts deflect in the same direction and there is no relative detection error created in the signals of the first drum 11 and second drum 12. The torque assisting system shown in FIGS. 1 through 9 has a significant effectiveness when applied to the automobile steering system.

Embodiment 2

Figure 10:
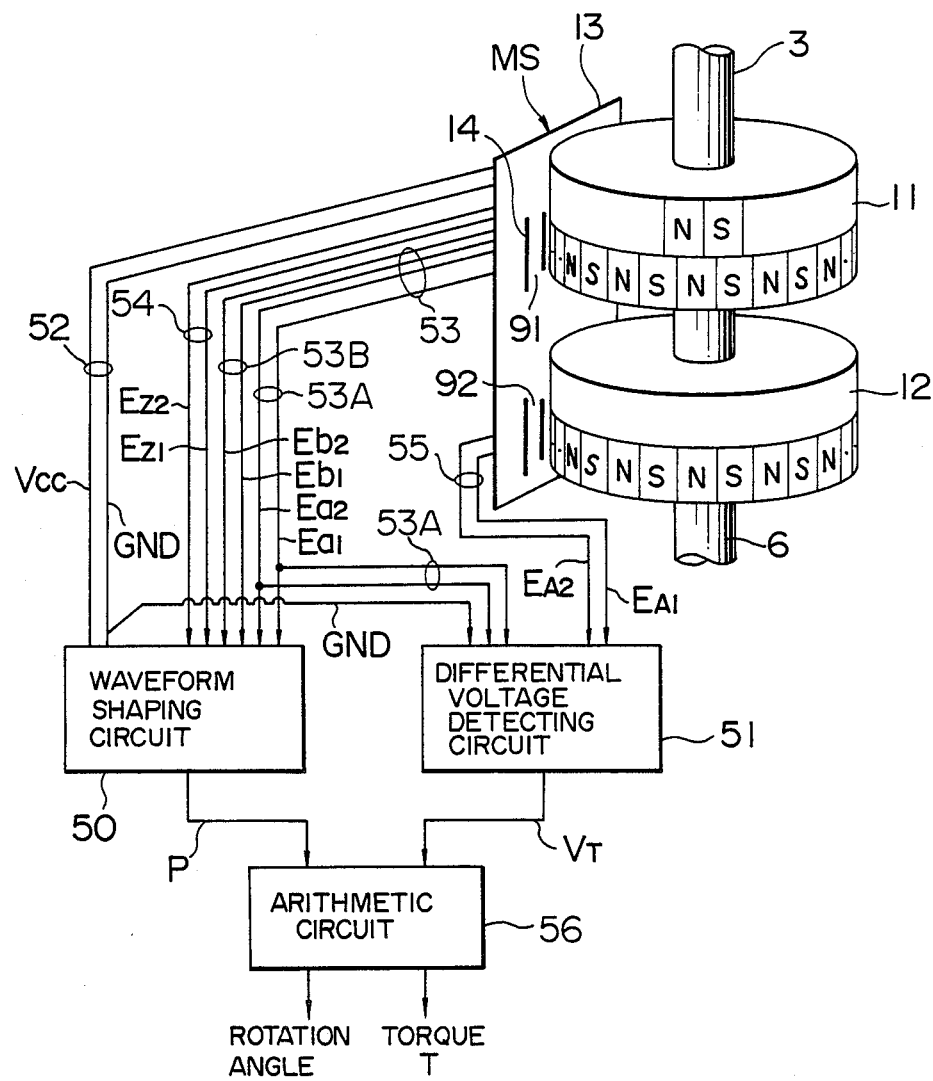

FIG. 10 shows an example of detecting the rotational angle and torque by using a waveform shaping circuit and a differential voltage detecting circuit. In the figure, the arrangement including the first drum 11, second drum 12 and magnetic sensor (MS) is identical to that shown in FIG. 2.

In this embodiment, the MR elements 14 have their output signals supplied to a waveform shaping circuit 50 and differential voltage detecting circuit 51. The waveform shaping circuit 50 and the magnetic sensor (MS) are connected by power lines (Vcc, GND) 52, signal lines 53 for signals $E_{a1}$, $E_{a2}$, $E_{b1}$ and $E_{b2}$ from the MR elements, and signal lines 54 for signals $E_{z1}$ and $E_{z2}$ from the MR elements. The differential voltage detecting circuit 51 is connected with the magnetic sensor (MS) by signal lines 53A for signals $E_{a1}$ and $E_{a2}$ from an MR element group 91 and signal lines for signals $E_{A1}$ and $E_{A2}$ from an MR element group 92.

The waveform shaping circuit 50, which is arranged as will be described later, is designed to produce a pulse signal P from the signals $E_{a1}$, $E_{a2}$, $E_{b1}$, $E_{b2}$, $E_{z1}$ and $E_{z2}$ provided by the MR element group 91 in the magnetic sensor (MS). The pulse signal from the waveform shaping circuit 50 is counted by an arithmetic circuit 56 so as to evaluate the rotational angle $\theta$.

The differential voltage detecting circuit 51, which is arranged as will be described later, is designed to produce a differential voltage signal $V_T$ from signals $V_X$ and $V_Y$ derived from the signals $E_{a1}$ and $E_{A1}$ among the detected signals $E_{a1}$, $E_{a2}$, $E_{A1}$ and $E_{A2}$. The differential voltage signal $V_T$ produced by the circuit 51 is fed to the arithmetic circuit 56, which then evaluates the torque from the above-mentioned rotational angle and the differential voltage signal $V_T$.

Figure 11:
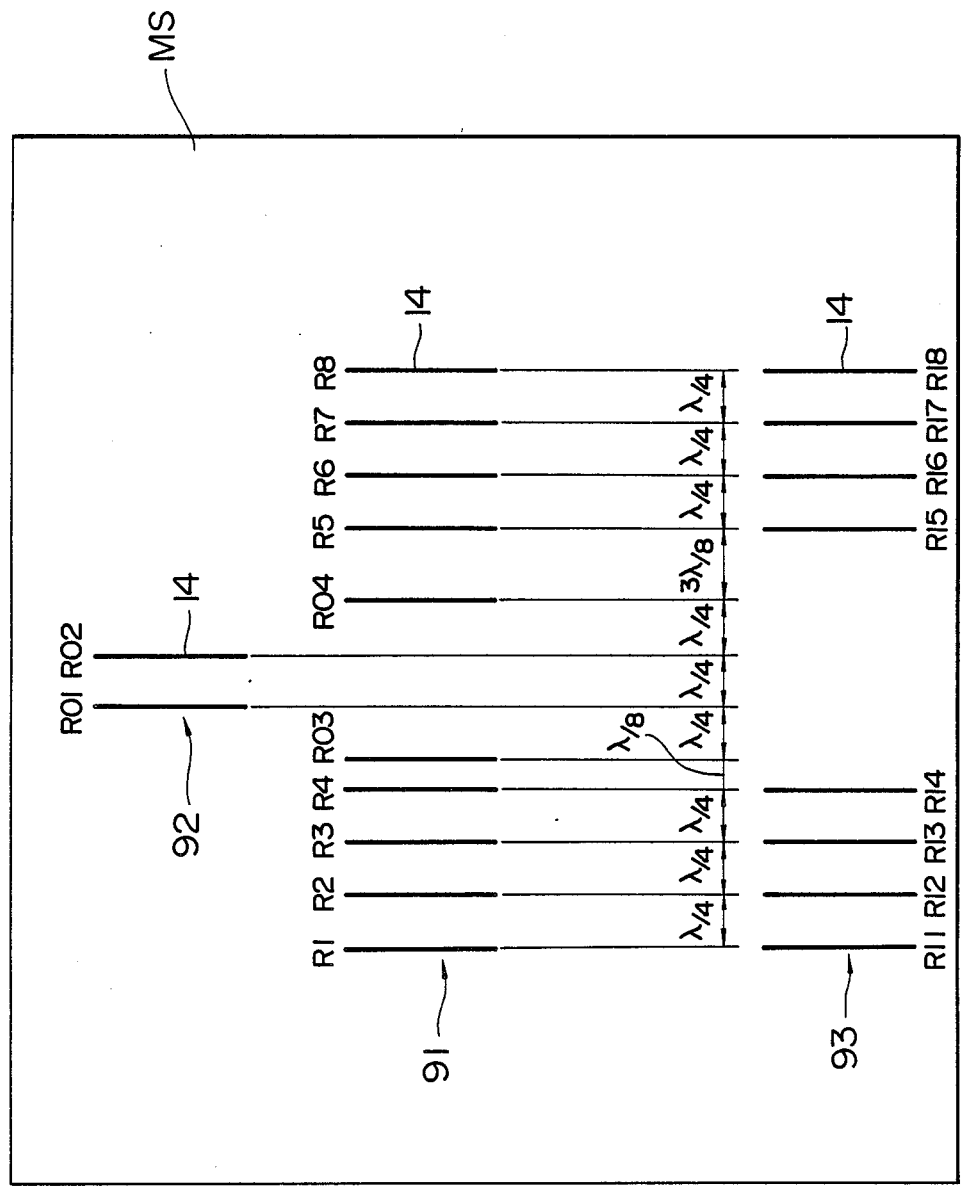

FIG. 11 shows the disposition of the MR elements in the magnetic sensor (MS). Although in the figure R01-R04 of MR elements 14 are shifted toward R4 by $\lambda/8$, when the drums shown in FIG. 10 are used, a symmetric arrangement with R01-R04 being shifted toward R5 by $\lambda/8$ is placed to confront the magnetic drum 11 shown in FIG. 10.

Figure 12:
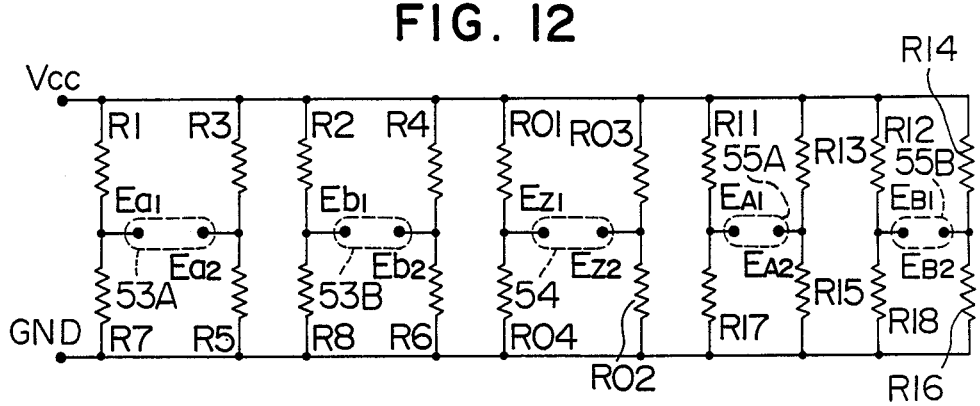

FIG. 12 shows the connection of MR element groups 91-93 in the magnetic sensor (MS). Among the MR elements 14, R1-R4, R11-R14, and R01 and R03 each have one end connected to the power source, while R5-R8, R15-R18, and R02 and R04 have each one end connected to the ground (GND). Other terminals of the MR elements 14 are connected to make pairs of serial connection between R1 and R7, R3 and R5, R2 and R8, R4 and R6, R01 and R04, R03 and R02, R11 and R17, and R13 and R15, with their nodes providing output terminals $E_{a1}$, $E_{a2}$, $E_{b1}$, $E_{b2}$, $E_{z1}$, $E_{z2}$, $E_{A1}$ and $E_{A2}$, thereby to form a bridge configuration.

Figure 13:
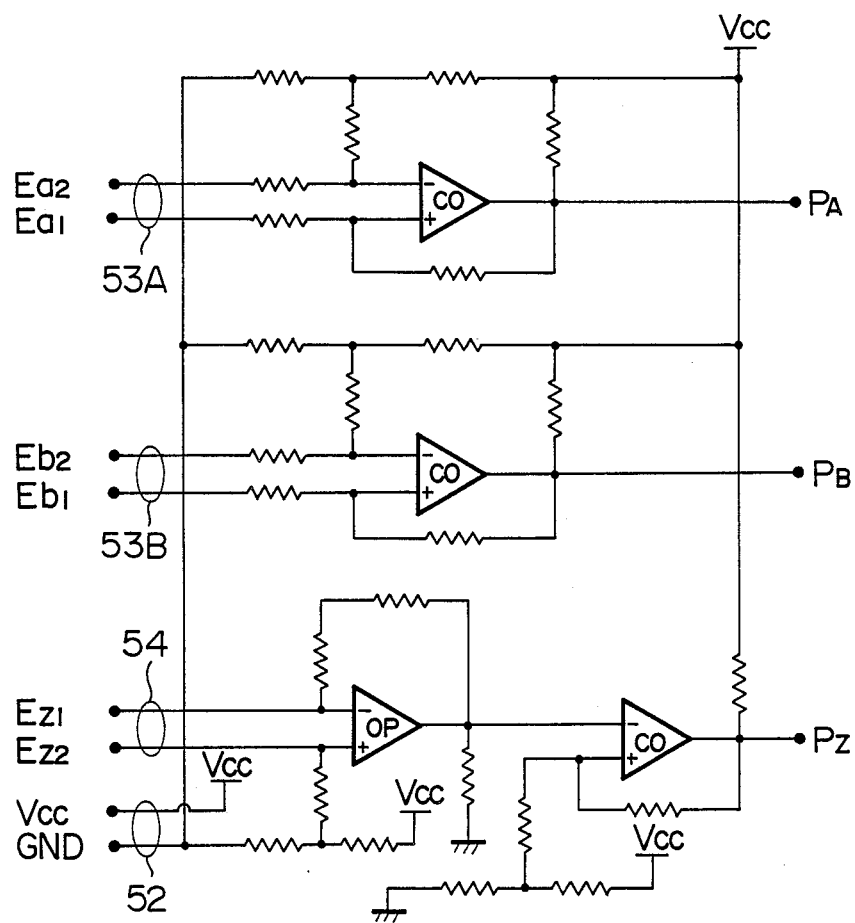

FIG. 13 is a schematic diagram of the waveform shaping circuit 50. The circuit receives the outputs $E_{a1}$, $E_{a2}$, $E_{b1}$, $E_{b2}$, $E_{z1}$ and $E_{z2}$ from the magnetic sensor (MS) during the rotation in either direction, and produces angular pulses $P_A$ and $P_B$ and a reference pulse $P_Z$ as a result of process.

Figure 14:
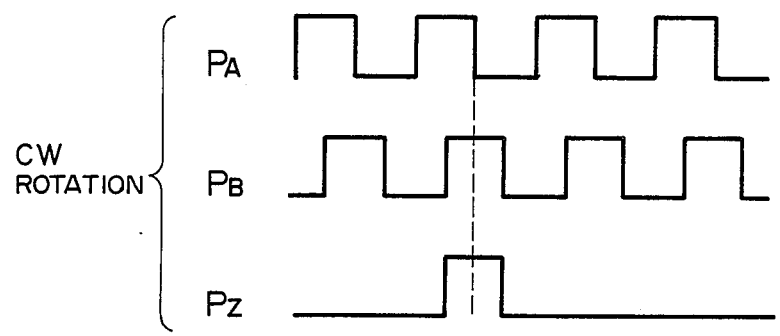
Figure 14:
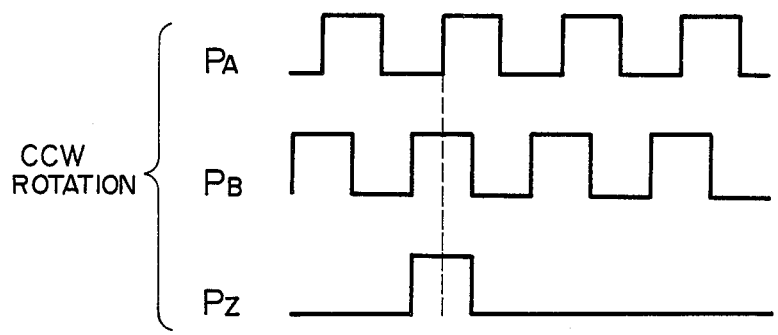

FIG. 14 shows the waveforms of the output pulses $P_A$, $P_B$ and $P_Z$ produced by the waveform shaping circuit 50 shown in FIG. 13. The reference pulse $P_Z$ is centered by the edge of the angular pulse $P_A$, as shown in FIG. 6.

Without providing a $\lambda/8$ shift between the consecutive signals and reference signals on the first drum 11 as shown in FIG. 10 and without a $\lambda/8$ shift in the disposition of the MR elements 14 (R01-R04) in the magnetic sensor (MS) toward R3 as shown in FIG. 11 so that they are asymmetric, waveforms similar to those of FIG. 14 can be produced.

Through a $\lambda/8$ shift in either the disposition of the reference signal on the first drum 11 or the disposition of the MR elements 17 in the magnetic sensor (MS) for producing the reference signal, it is possible for the reference pulse to arise so that it is centered by the edge of the angular pulse, and this makes the detection accurate without incurring the angle reading error. The rotational direction is discriminated on the basis of a comparison of phase A and phase B, i.e., phase A leads phase B by 90° in the counterclockwise rotation and the opposite phase relation results in the clockwise rotation. By reading angles at a certain time interval, the rotational speed is evaluated.

Figure 15:
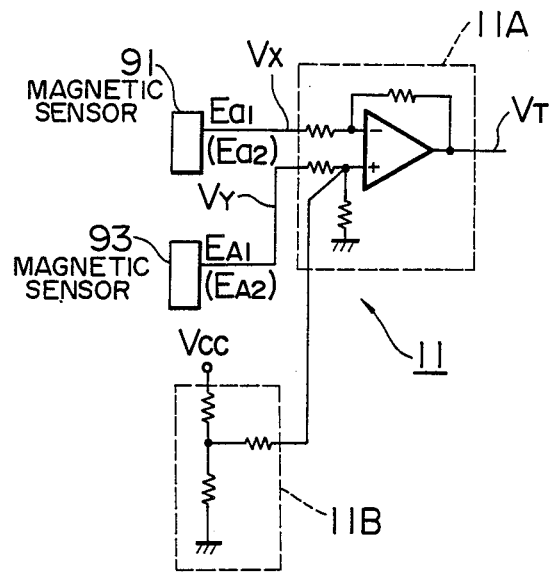

FIG. 15 is a schematic diagram of the differential voltage detecting circuit 51. The circuit 51 comprises a differential amplifier 11A which amplifies the difference of two input signals and an output voltage adjusting circuit 11B which is connected to the differential amplifier 11A for adjusting its output voltage. The circuit 51 receives the signal $E_{a1}$ from the magnetic sensor 91 and the signal $E_{A1}$ from the magnetic sensor 93 on the respective input terminals, amplifies the differential voltage of the inputs, and produces a differential voltage signal $V_T$. The signals $E_{a2}$ and $E_{A2}$ from the magnetic sensors 91 and 93 are left disconnected and unused.

Figure 16:
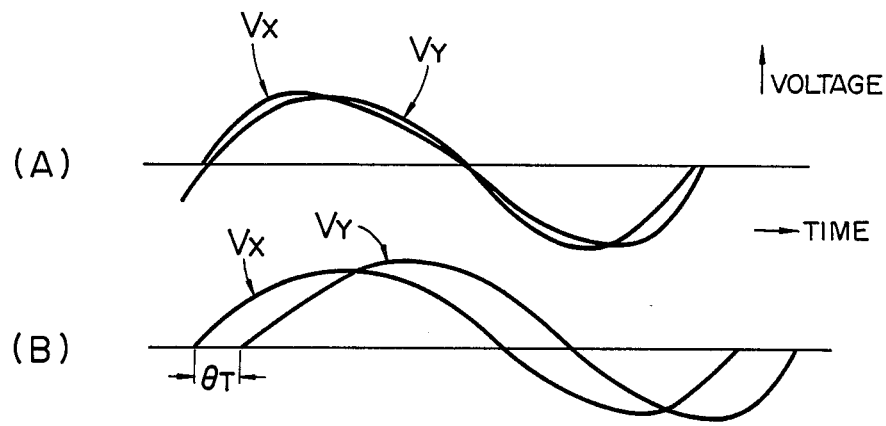

FIG. 16 shows the signals $V_X$ and $V_Y$ entered to the differential voltage detecting circuit 51. In the absence of torque generation, the signals $V_X$ and $V_Y$ coincide with each other as shown by (A) of FIG. 16, and the differential voltage detecting circuit 51 produces a zero output voltage $V_T$. The signals $V_X$ and $V_Y$ develop a difference in accordance with the magnitude of torque as shown by (B) in FIG. 16, and consequently the differential voltage detecting circuit 51 produces an output voltage $V_T$ depending on the voltage difference.

The following describes the behavior of this embodiment arranged as described above. The output signals $V_X$ ($E_{a1}$) and $V_Y$ ($E_{A1}$) from sensors 91 and 93 in the magnetic sensor (MS) are given as functions of the rotational angle $\theta$ of the shaft 3 and the torsional angle $\theta_T$ of the torsion bar 15 as follows.

$$V_X = C1 \sin \theta \qquad (1)$$

$$V_Y = C2 \sin(\theta \pm \theta_T) \qquad (2)$$

where C1 and C2 are constants.

These detected signals $V_X$ and $V_Y$ are applied to the input terminals of the differential amplifier 11A in the differential voltage detecting circuit 11.

In order to be rid of the influence of the constants C1 and C2, the output voltage adjusting circuit 11B is adjusted so that C1=C2=C. Consequently, the differential amplifier 11A provides its differential voltage $V_T$ free from the influence of C1 and C2, and the differential amplifier 11A operates to meet the following.

$$V_T = K(V_X - V_Y) \qquad (3)$$

where K represents the amplification factor of the amplifier.

Substituting equations (1) and (2) into equation (3) results as follows.

$$\begin{aligned} V_T &= K(V_X - V_Y) \\ &= KC [\sin \theta - \sin(\theta \pm \theta_T)] \\ &= Ko [\sin \theta - \sin(\theta \pm \theta_T)] \\ &= Ko\, 2 \cos[(2\theta \pm \theta_T)/2] \sin(\mp \theta_T/2) \\ &= Ko [2\cos(\theta \pm \theta_T/2) \sin(\mp \theta_T/2)] \end{aligned} \qquad (4)$$

where $Ko = K \cdot C$

Since $\theta_T$ is generally very small, equation (4) is reduced to as follows.

$$V_T \approx Ko \mp \theta_T \cos \qquad (5)$$

With Ko and $\theta$ conceivably being constants, the differential voltage detecting circuit 51 produces a differential voltage $V_T$ which is proportional to the torsional angle $\theta_T$ of the torsion bar 15.

The arithmetic circuit 56 receives the voltage $V_T$ and carries out the following operation using $\cos \theta$ which has been evaluated previously, and the torsional angle $\theta_T$, i.e., torque T, is evaluated.

$$\mp \theta_T = V_T/(Ko \cos \theta) \qquad (6)$$

The differential voltage detecting circuit 51 shown in FIG. 15 can be fabricated integrally to gain compactness.

Embodiment 3

Figure 17:
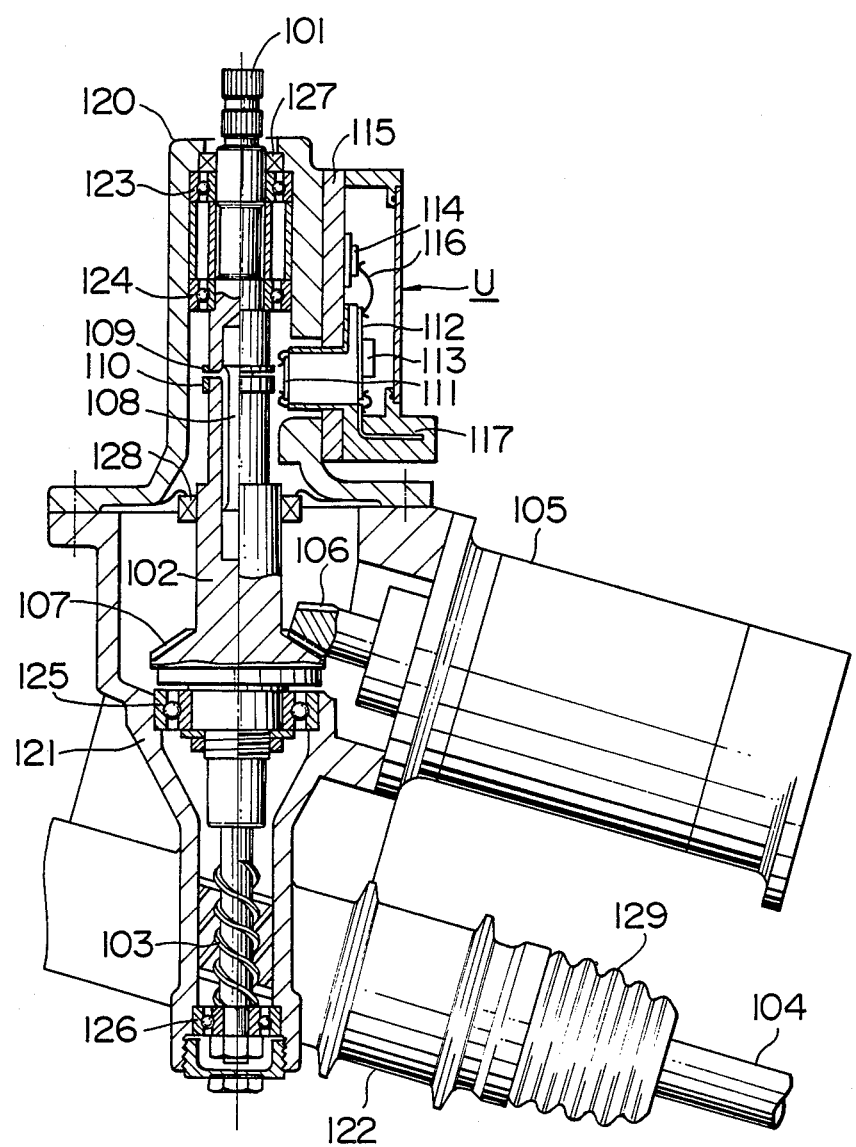

The torque assisting system, which is the third embodiment of this invention, will be described with reference to FIGS. 17 to 22. FIG. 17 shows the embodiment applied to a rack-and-pinion, electric power steering system of an automobile. Indicated by 101 is a shaft of a steering wheel, 102 is a shaft of a pinion, 103 is a pinion, 104 is a shaft of a rack, 105 is an electric motor, 107 is a bevel gear, 108 is a torsion bar, 109 and 110 are magnetic drums of torque sensor, 111 are magnetic resistance elements of torque sensor, 112 is a circuit board, 113 are various control circuit components including a 1-chip microcomputer, 114 are switching power FETs, 115 is a heat sink, 116 is an internal wiring, 117 is a connector, 120 is a sensor support, 121 is a motor support, 122 is a rack support, 123-126 are bearings, 127 and 128 are oil seals, and 129 is a dust seal.

A steering wheel is fitted on the steering wheel shaft 101. The steering torque applied to the shaft 101 is transmitted through the torsion bar 108 to the pinion shaft 102, and the rotation of the pinion 103 moves the rack 104 to perform steering of the vehicle.

The motor 105 is provided with a pinion 106 on its drive shaft, and it is coupled with the pinion shaft 102 through the bevel gear 107. When the motor is activated to produce a torque, it is applied to the pinion shaft 102 to provide an assisting steering force.

The magnetic drums 109 and 110 have their circumferential sections magnetized at a certain pitch, and are fitted on the lower end of the steering shaft 101 and the upper end of the pinion shaft 102, respectively. The steering shaft 101 and the drums rotate together generally. Due to the torque transmitted from the steering shaft 101 to the pinion shaft 102, the torsion bar 108 develops a torsion, causing the magnetic drums 109 and 110 to have different angular positions, and the torque is detected from the displacement.

The magnetic resistance elements 111 which constitute a non-contact torque sensor in unison with the magnetic drums 109 and 110 are assembled integrally with a control circuit unit U which includes the control circuit components 113 on the circuit board 112, the power FETs 114 on the heat sink 115, and the connector 117, so that the elements 111 have a proper positional relation with the magnetic drums 109 and 110 when the control circuit unit U is fitted to the prescribed position on the sensor support (sensor housing) 120.

The sensor support 120, motor support 121 and rack support 122 are made of aluminum die casting alloy or the like, and are designed not only to support the steering shaft 101 and pinion shaft 102 through the bearings 123-126 and support the control circuit unit U and motor 105, but also to function as a gear box for the pinion 103 and rack 104, and further serve to modularize the whole assembly.

Figure 18:
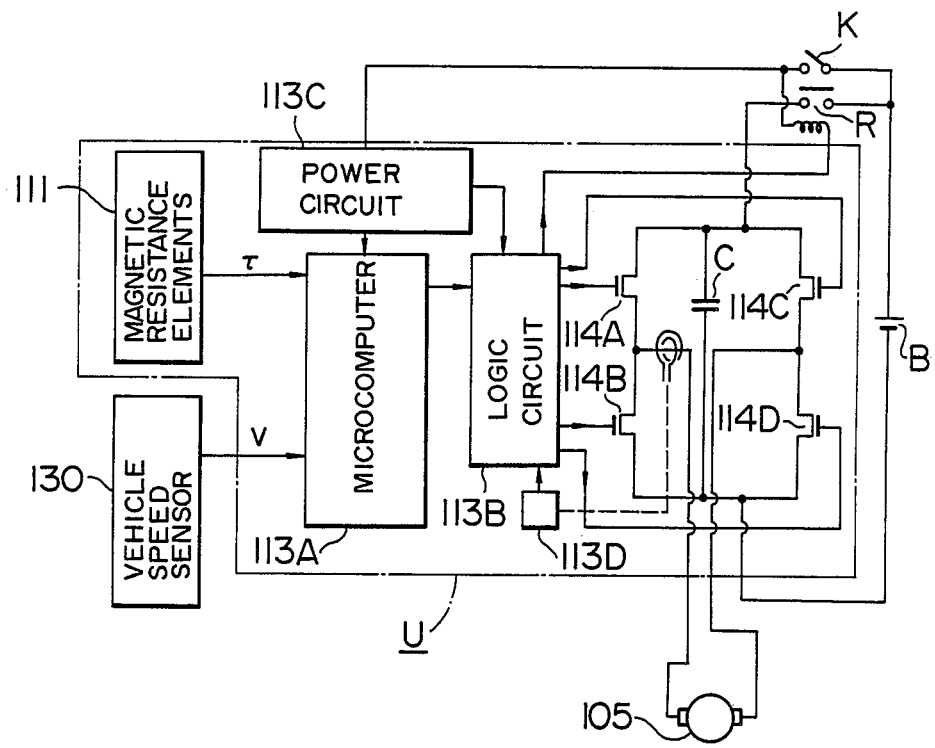

FIG. 18 shows the overall control circuit for the motor 105 inclusive of the control circuit unit U. The circuit introduces the torque signal $\tau$ from the magnetic resistance elements 111 and the vehicle speed signal v from the speed sensor 130 into a microcomputer 113A for computation, operates on a logic circuit 113B to implement signal processing, and operates on FETs 114A-114D in bridge configuration to drive the motor 105 in chopping control mode under current control based on the signal detected by the current sensor 113D so that the intended assisting steering force (torque) is produced.

A battery B supplies power through a vehicle key switch K to a power circuit 113C, which produces a stabilized +5 and +15 voltages to be supplied to the microcomputer 113A and logic circuit 113B. The motor 105 is supplied with power through a relay R, so that the power is shut off by deactivation of the relay in the event of abnormality.

Figure 19:
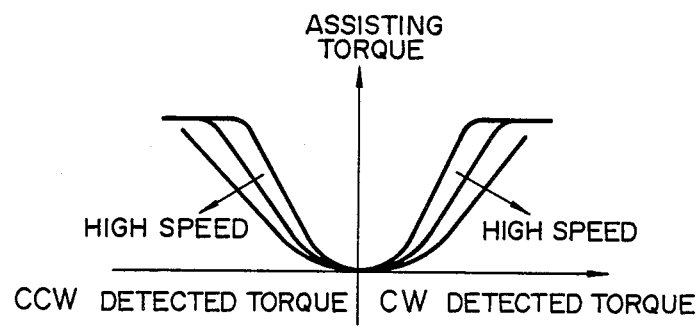

FIG. 19 shows the characteristics of assisting torque (assisting steering force) plotted against the torque sensor output, with the vehicle speed being a parameter. The system is designed to provide the assisting torque which decreases as the vehicle speed increases.

Figure 20:
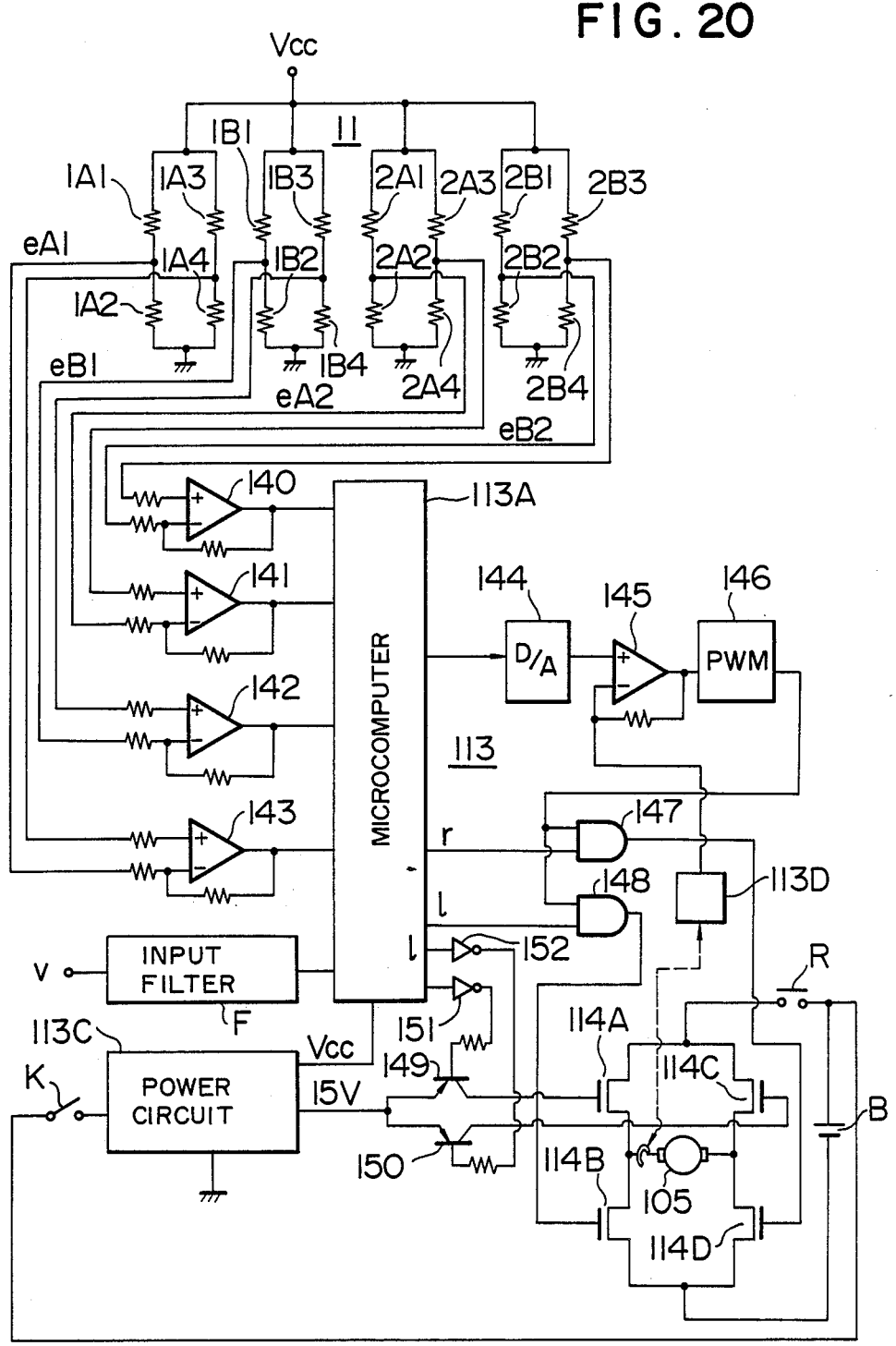

The control circuit will be described in more detail with reference to FIGS. 20, 21 and 22. In this embodiment, as shown in FIG. 20, the magnetic resistance elements 111 includes elements 1A1-1A4 and and 1B1-1B4 in two sets of bridge configuration provided to confront one magnetic drum 109 and elements 2A1-2A4 and 2B1-2B4 in two sets of bridge configuration provided to confront another magnetic drum 110, i.e., a total of four element bridges.

Figure 21:
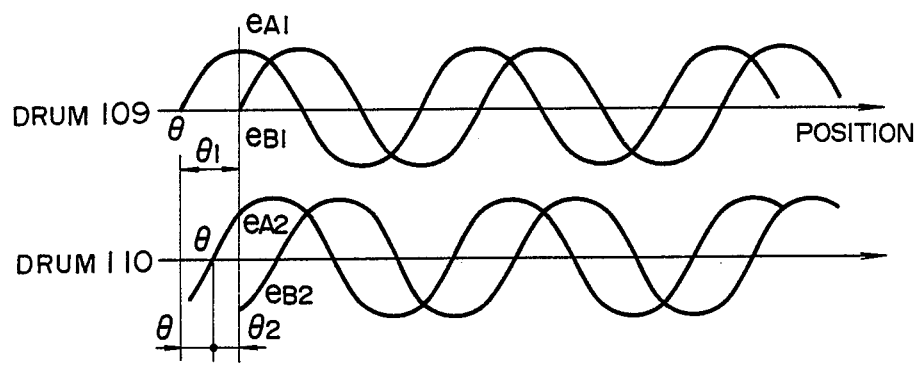

In operation, when the steering wheel is operated and the steering shaft 101 is turned by a certain magnitude of torque, one bridge including the elements 1A1-1A4 for the magnetic drum 109 produces a voltage $e_{A1}$ shown in FIG. 21, and another bridge including the elements 1B1-1B4 produces a voltage $e_{B1}$. The sensor elements are so disposed that the generated voltages $e_{A1}$ and $e_{B1}$ are out of phase with each other by 90°, and the steering shaft 101 has its rotational angle $\theta_1$ with respect to a certain reference point 0 given as:

$$\theta_1 = \tan^{-1}(e_{B1}/e_{A1}).$$

One bridge including the elements 2A1-2A4 for the magnetic drum 110 produces a voltage $e_{A2}$, and another bridge including the elements 2B1-2B4 produces a voltage $e_{B2}$. These voltages $e_{A2}$ and $e_{B2}$ are also out of phase with each other by 90°, and the sensing position $\theta_2$ with respect to the reference point 0 is given as: $\theta_2 = \tan(e_{B2}/e_{A2})$.

Since the steering shaft 101 and pinion shaft 102 are connected by the torsion bar 108, the transmission of torque between the shafts yields a difference in rotational angle between the magnetic drums 109 and 110 as: $\theta = \theta_1 - \theta_2$. From the differential angle $\theta$, the torque $\tau$ is detected as follows.

$$\tau = K\theta = K(\theta_1 - \theta_2)$$

where K is a constant dependent on the rigidity of the torsion bar 108, etc.

Figure 22:
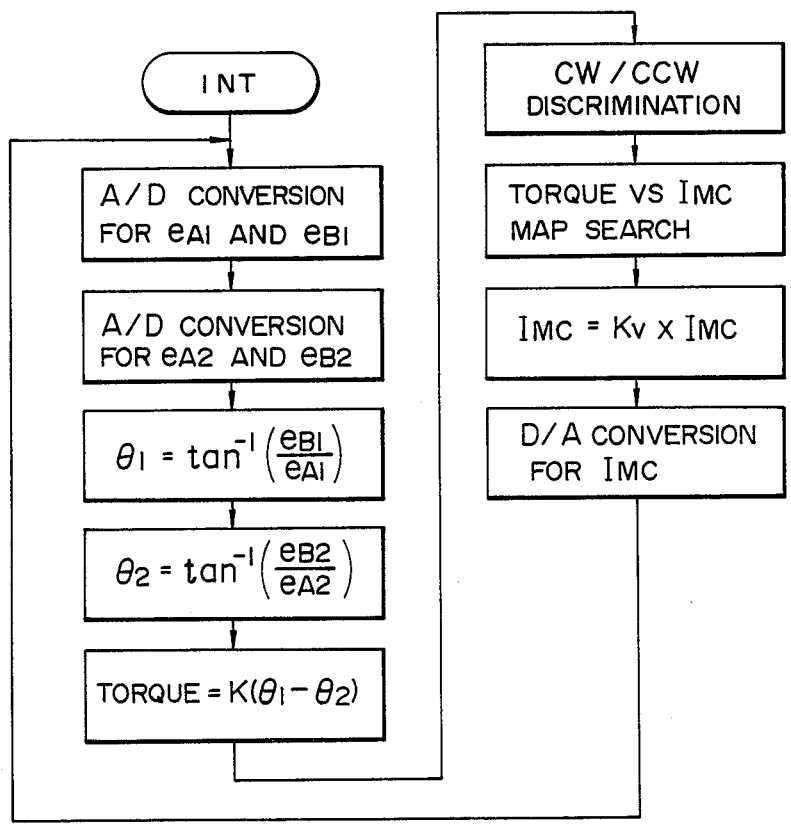

The microcomputer 113A has an interrupt processing routine shown in FIG. 22, which samples the voltages $e_{A1}$, $e_{B1}$, $e_{A2}$ and $e_{B2}$ at a 0.2-0.5 ms interval, calculates the rotational angles $\theta_1$ and $\theta_2$ and torque, discriminates the rotational direction based on the polarity of torque, searches an $I_{MC}$ map using the evaluated torque, calculates the $I_{MC}$ based on the vehicle speed modification factor kv, and delivers an 8-bit $I_{MC}$ command data to a D/A converter 144. In the above process, the voltages $e_{A1}$ through $e_{B2}$ are fed through operational amplifiers 140-143 to the microcomputer 113A which incorporates an A/D converter. The vehicle speed signal v is introduced through an input filter F to the microcomputer 113A, which counts the signal.

The result of process shown in FIG. 22 by the microcomputer 113A is fed to the D/A converter 114, and the resulting analog signal is applied to a noninverting input of a differential amplifier 145 which has an inverting input to receive a current signal of the motor 105 detected by a current sensor 113D. The amplifier 145 produces a differential output, which is entered to a pulse-width modulation (PWM) signal generator 146. The output of the PWM generator 146 is fed through AND gates 147 and 148 so that it is gated by the rotational direction signals r and l, and delivered as inputs of FETs 114B and 114D. A power circuit 113C produces a 15-volt gate control voltage, which is supplied through driving FETs 149 and 150 to other FETs 114A and 114C for their switching operation. Inverters 151 and 152 serves as buffers.

According to this embodiment, the control circuit unit U and magnetic resistance elements 111 are fabricated in an integral module, which eliminates the need of external wirings, simplifies the assembling work, and makes the apparatus compact, noise-immune and reliable.

According to this embodiment, the control circuit unit U is not in contact with a portion which can be hot, such as the motor 105, making itself free from thermal problems. Instead, it is directly fitted on the sensor housing (sensor support 120) made of aluminum die casting alloy or the like capable of heat-sinking to some extent, which enables the heat generating components to have smaller cooling fins or possibly eliminate such a device at all, and the weight of the apparatus is reduced.

Moreover, according to this embodiment, the most mechanical components of power steering system including the motor 105 are preassembled integrally on the sensor support 120, motor support 121 and rack support 122, which facilitates their installation in the vehicle engine compartment and also results in a significant cost reduction.

In addition, according to this embodiment, the use of the magnetic resistance elements 1A1-2B4 in four sets of bridge configuration for the torque sensor ensure the signal detection and the operation is highly reliable.

The invention is not confined to the use of the foregoing sensor made up of magnetic resistance elements and magnetic drums, but it may be replaced with any type of sensor which performs torque detection in a non-contact manner.

Embodiment 4

Figure 23:
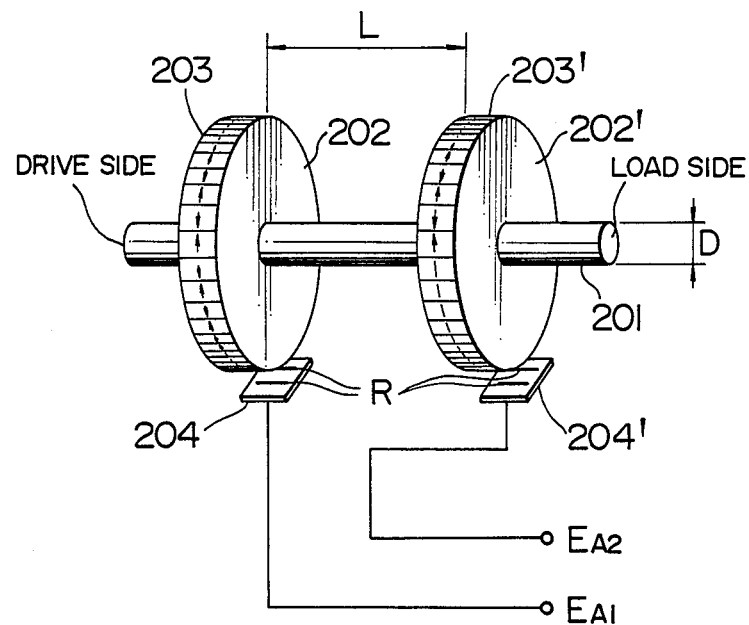
Figure 24:
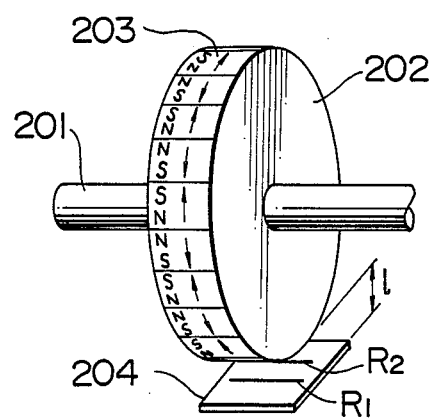
Figure 26:
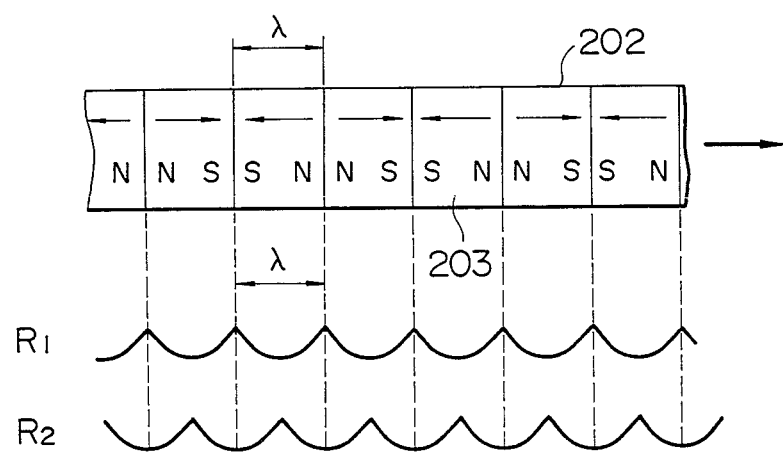
Figure 27:
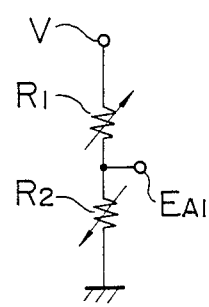

The torque detecting apparatus of this embodiment is capable of detecting the torque in any state regardless of rotation or stoppage. FIG. 23 shows in brief the structure of the apparatus, FIG. 24 shows the relation between one of the magnetic drums and the magnetic sensor in FIG. 23. FIG. 24 shows by development part of the structure of FIG. 24, and FIGS. 26 and 27 are waveform diagrams for explaining the operation. Although this embodiment is technically identical in part to the preceding embodiments, it will be explained from the beginning for the sake of better understanding.

In FIG. 23, indicated by 201 is a rotary shaft, and 202 and 202' are rotary drums. The rotary drums 202 and 202' having magnetic members 203 and 203', with magnetic signals being recorded thereon, are fitted on the shaft 201 with a spacing of L from each other. Indicated by 204 is a magnetic sensor made up of magnetic resistance elements (will be termed "MR elements") R, and it is disposed to confront the rotary drums 202 and 202' with a small clearance.

The operation of the rotary drums 202 and 202' and the magnetic sensors 204 and 204' will be described on FIG. 24, which is the extraction of the rotary drum 202 and magnetic sensor 204 from FIG. 23. As mentioned previously, the magnetic member 203 on the rotary drum 202 has a record of magnetic signal which is a series of N and S poles encircling the circumferential surface, and the magnetic sensor 204 made up of MR elements R1 and R2 is disposed to confront the drum surface with a clearance of l.

Figure 25:
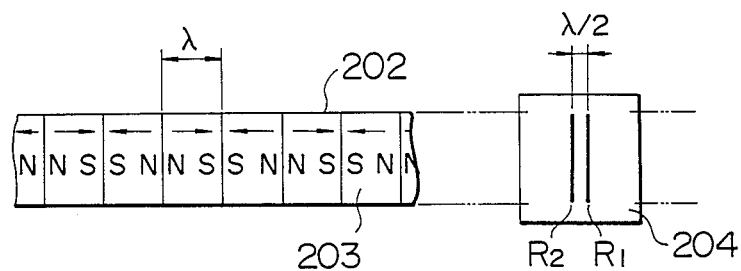
Figure 28A:
FIGS. 28A and 28B are waveform diagrams of the output produced on the central terminal of the 3-terminal configuration.
Figure 28B:

FIG. 25 is an enlarged development diagram showing the positional relation between the magnetic member 203 on the rotary drum 202 and the magnetic sensor 204 shown in FIG. 24. In the figure, the MR elements R1 and R2 are spaced out from each other by $\lambda/2$, where $\lambda$ is the recording wavelength (the distance between N and S poles). FIG. 26 shows the operational waveforms. In FIG. 26, a magnetic member 203 on the rotary drum 202 moves as shown by the arrow as the rotary drum 202 rotates. The MR elements R1 and R2 have their resistance values reduced by application of a signal which is a variation of flux of the N pole or S pole of the magnetic signal, as generally known, and when the magnetic member 203 moves as shown by the arrow, the resistance values of MR elements R1 and R2 vary in accordance with the recording wavelength $\lambda$, resulting in the waveforms out of phase with each other by $\lambda/2$. The MR elements R1 and R2 are connected to provide three terminals as shown in FIG. 27, with a voltage V being applied between both ends, and the output terminal $E_{A1}$ provides a voltage waveform as shown in FIG. 28A. The output $E_{A1}$ corresponds to the magnetic signal recorded on the magnetic member 203. In the same manner, the waveform $E_{A2}$ shown in FIG. 28B is produced by the rotary drum 202' and magnetic sensor 204' shown in FIG. 23.

In the torque detecting apparatus of FIG. 23, when a motor is coupled to the drive side of the shaft 201 and a load is coupled to the load side, the shaft 201 develops a torsion to an angle of $\theta$ in proportion to the applied load torque. The torsional angle is expressed as follows.

$$\theta = (32/\pi \times G) \times (L/D^4) \times T \qquad (7)$$

where $\theta$ is a torsional angle (rad), G is a shearing factor (kg/cm$^2$), L is a distance between drums (cm), and D is a diameter of shaft (cm). The shearing factor G is determined from the material of the shaft. Accordingly, once the drum distance L and shaft diameter D are set, the torque T vs. torsional angle $\theta$ relation is determined, and it becomes possible to measure the torque by detecting the torsional angle $\theta$ of the shaft 201.

Figure 29A:
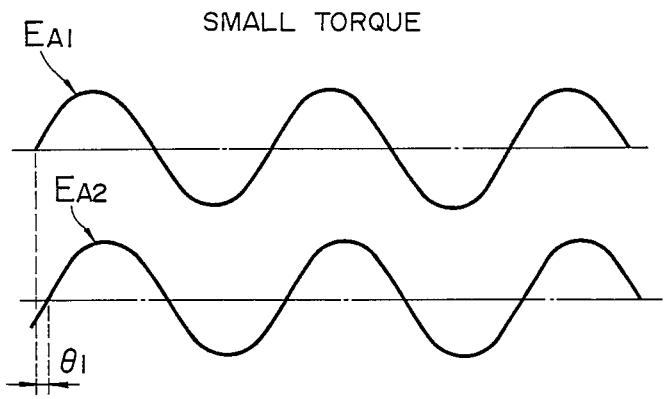
FIGS. 29A and 29B are diagrams used to explain the load torque detection based on the output waveforms provided by the magnetic sensor.
Figure 29B:
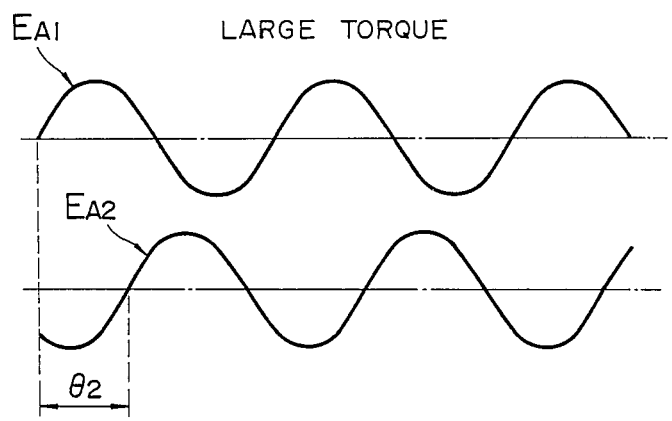

An example of measuring the torsional angle $\theta$ of the shaft 201 is shown in FIGS. 29A and 29B. In FIG. 29A, the torsional angle $\theta$ of the shaft 201 is measured by detecting a phase difference $\theta_2 - \theta_1$ between the output $E_{A1}$ provided by the rotary drum 202 and magnetic sensor 204 and the output $E_{A2}$ provided by the rotary drum 202' and magnetic sensor 204' at their zero-cross points. FIG. 29A is the case of a small load torque, in which the shaft 201 has a small torsional angle and therefore the phase difference $\theta_1$ of the outputs $E_{A1}$ and $E_{A2}$ at zero-cross is also small. Conversely, FIG. 29B is the case of a large load torque, in which the shaft 201 has an increased torsion and therefore the phase difference $\theta_2$ at zero-cross also increases. In conclusion, the magnitude of torque can be measured by detecting the phase difference $\theta_1$ or $\theta_2$.

Figure 30:
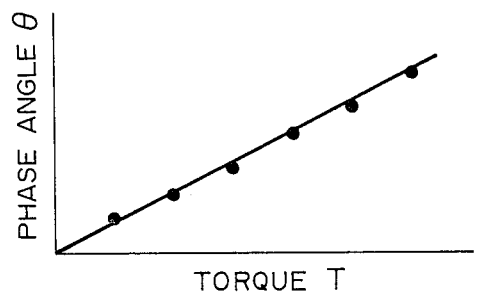

FIG. 30 shows, as an example, the characteristics of the inventive torque detecting apparatus, in which the phase angle $\theta$ is plotted against the torque T.

Figure 31:
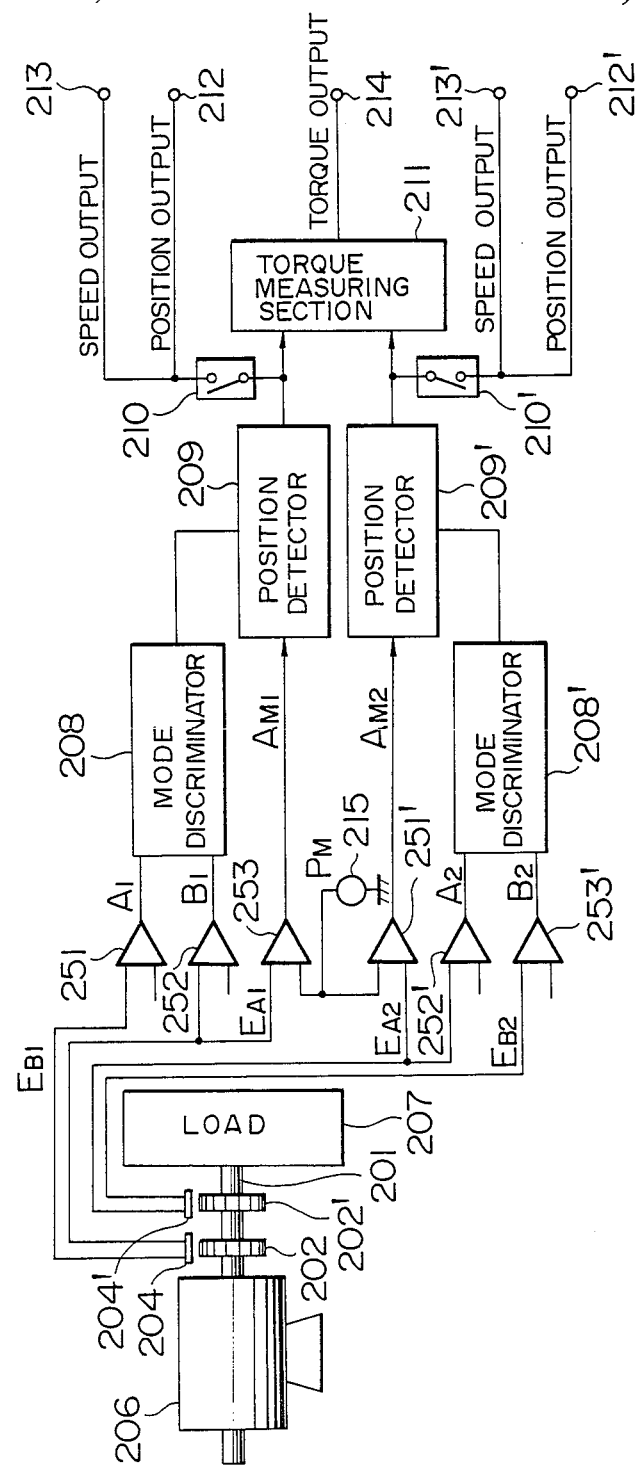
Figure 32:
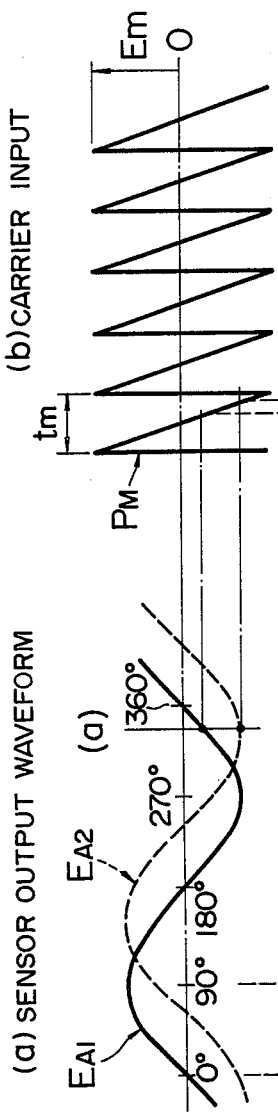
Figure 32:
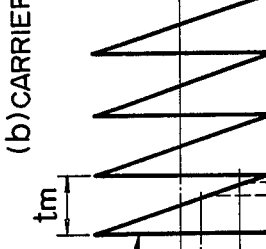
Figure 32:
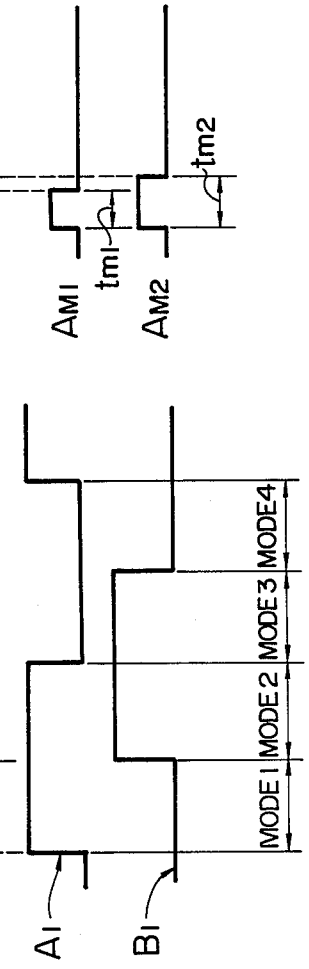

The MR elements R varies in resistance in proportion to the magnitude of magnetic flux as mentioned above, and the MR elements have a constant application of magnetic field from the N and S poles of the magnetic members 203 and 203' on the rotary drums 202 and 202' even if the shaft 201 is stationary, whereby the torque of the shaft 201 in stoppage can be detected. FIGS. 31 and 32 show an example of torque detection in stoppage.

FIG. 31 shows an example, in which the inventive torque detecting apparatus is built in a motor 206. The rotary drums 202 and 202' are fitted on the shaft 201 of the motor 206 with an arbitrary spacing provided between them. The magnetic sensors 204 and 204' are disposed to confront the rotary drums 202 and 202', respectively, with a small clearance provided between them. The shaft 201 is coupled at its one end nearer to the rotary drums 202 and 202' with a load such as a machine tool for example. Owing to the advanced inverter technique, a growing number of machine tools are driven by a.c. motors in place of d.c. motors these days. It is necessary for the control of machining accuracy and machining speed to have a feedback of axial torque of the drive motor. The axial torque of a d.c. motor can readily be detected from the motor current which is proportional to the torque, whereas an a.c. motor does not have a proportional relation between the current and torque and the torque is hardly detected from the current. The situation demands a torque detecting device such as that of this invention.

The torque detecting apparatus of FIG. 31 differs from that of FIG. 23 in that magnetic sensors 204 and 204' are designed to produce 2-phase outputs with the intention of using the sensor outputs for the position detection and speed detection besides the torque detection. The MR sensor R is fabricated by the evaporative deposition of permalloy or the like on a glass substrate, as mentioned previously, and the 2-phase sensor outputs can be accomplished through a simple modification of MR element pattern which is formed on the glass substrate, without increasing the number of magnetic sensors 204 and 204' and without changing the dimensions of sensors, whereby the overall system structure can be made simple.

In FIG. 31, the magnetic sensors 202 and 202' delivers 2-phase outputs $E_{A1}$ and $E_{B1}$, and $E_{A2}$ and $E_{B2}$, respectively, with a 90° phase difference between phases. These output signals are treated by comparators 251, 252, 253, 251', 252' and 253' so that they are converted to rectangular waves A1, B1, A2 and B2. The 2-phase rectangular waves A1 and B1 are used to partition the output $E_{A1}$ of the magnetic sensor 204 into four modes as shown in FIG. 32(B). For example, A1=high and B1=low in the range 0°-90° of $E_{A1}$, A1=high and B1=high in the range 90°-180°, A1=low and B1=high in the range 180°-270°, and A1=low and B1=low in the range 270°-360°. Other rectangular waves A2 and B2 are used to partition the output $E_{A2}$ of magnetic sensor 204' into four modes. At the same time, the outputs $E_{A1}$ and $E_{A2}$ of the magnetic sensors 204 and 204' are each compared with a triangular carrier wave $P_M$ shown by (b) in FIG. 32(A), and outputs $A_{M1}$ and $A_{M2}$ are produced. Assuming the outputs $E_{A1}$ and $E_{A2}$ of magnetic sensors 204 and 204' to be sinusoidal as shown by (a) in FIG. 32(A), the angle $\theta$ can be evaluated in terms of analog values of the outputs $E_{A1}$ and $E_{A2}$. The analog values of $E_{A1}$ and $E_{A2}$ each have a same voltage at one point in a cycle. Mode discriminators 208 and 208' discriminate ranges 0°-90°, 90°-180°, 180°-270°, and 270°-360°. Position detectors 209 and 209' provide positional information 212 and 212' and speed information 213 and 213'. The position and speed of the load 207 can be detected at a higher accuracy by using the rotary drum 202' and magnetic sensor 204' nearer to the load. If it is intended to have a smoother motor control, position and speed information based on the rotary drum 202 and magnetic sensor 204 nearer to the drive motor is used preferably. The detected information on the load side or drive side may be used selectively depending on the operational state of the load through the provision of switches 210 and 210'.

With the rotary drums 202 and 202' being quiescent at point (a) in FIG. 32(A), the comparator produces a pulse $A_{M1}$ having a width $t_{b1}$ which is the time when the carrier wave $P_M$ reaches the point (a) of the output $E_{A1}$ of the magnetic sensor 204. At this time, if a torque T is applied to the shaft 201 of the motor 206 in FIG. 31, the output $E_{A2}$ provided by the rotary drum 202' and magnetic sensor 204' has a waveform shown by the dashed line in FIG. 32(A), and in this case a pulse $A_{M2}$ with a time width $t_{m2}$ is produced. The pulses $A_{M1}$ and $A_{M2}$ are proportional to the analog values of the sensor outputs $E_{A1}$ and $E_{A2}$, and their time widths $t_{m1}$ and $t_{m2}$ are introduced to a torque measuring section 211, which then evaluates the angular difference between the drums 202 and 202', thereby enabling the torque detection.

Although in this embodiment the rotary drums 202 and 202' and the magnetic sensors 204 and 204' are fitted on the exterior of the shaft 201 of the motor 206, the rotary drums 202 and 202' and the magnetic sensors 204 and 204' may be fitted inside the motor 206.

Figure 33:
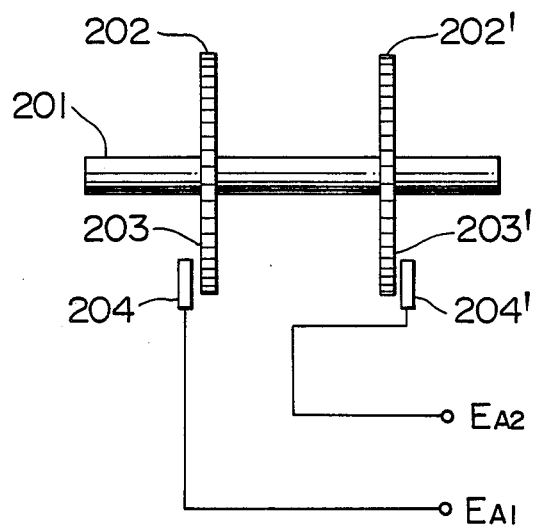

Although the rotary drums 202 and 202' are in a shape of drum, another possible structure includes discs with magnetic members 203 and 203' being fitted on the surface (one side or both sides) of the discs as shown in FIG. 33. In case the magnetic members 203 and 203' are fitted on both sides of discs, the increased number of magnetic sensors are required.

This embodiment, which is intended to provide information of position detection and speed detection as well as torque detection, enhances the reliability and accuracy of motor control. According to the invention described on FIGS. 23-33, the torque detecting apparatus is configured by rotary drums having magnetic members on which magnetic signals are recorded and magnetic sensors on which MR elements are arrayed, and it is capable of detecting the torque even during a stoppage. The output of the magnetic sensor is constant irrespective of revolutions, and the processing circuit can be simplified. The use of magnetism is advantageous with respect to environmental concerns such as dusts and dews, and a reliable torque detecting apparatus is realized.

Embodiment 5

A preferable shape of the rotary drums shown in FIG. 23 will be described. In the structure of FIG. 23, the rotary drums 203 and 203' are disposed in a considerable distance from each other, and the magnetic sensors 204 and 204' are also disposed apart.

The embodiment described in the following is intended to make the disposition of a pair rotary drums or rotary discs as close as possible so that they are recorded simultaneously with a single recording head and their magnetic signals are detected with a single integrated magnetic sensor thereby to realize a torque detecting apparatus without incurring the positional error.

Figure 34:
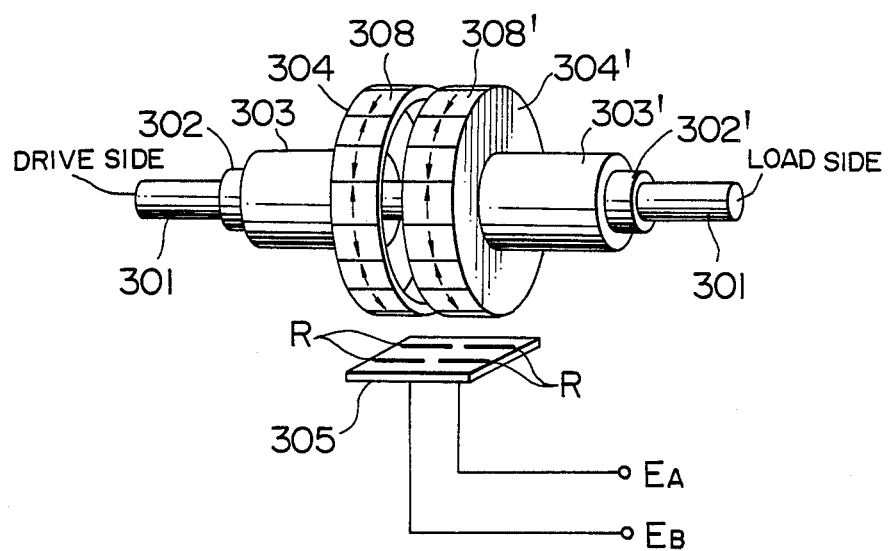
Figure 35:
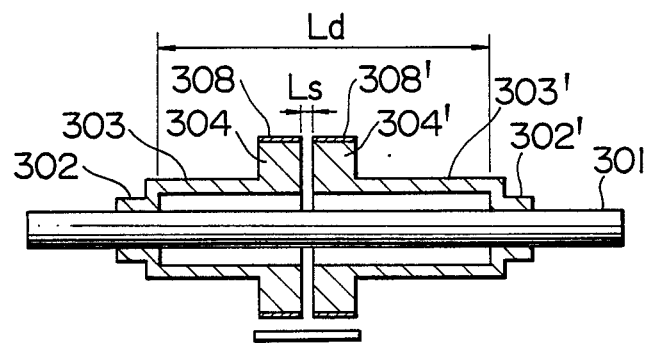
Figure 36:
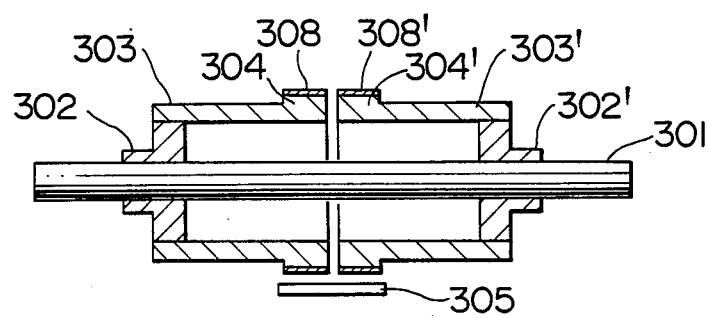

In FIGS. 34 and 35, indicated by 301 is a rotary shaft and 303 and 303' are rotary drums each having a cup shape. Indicated by 302 and 302' are shaft attachment portions for fitting the rotary drums 303 and 303' on the shaft 301. The rotary drums 303 and 303' have magnetic recording sections 304 and 304' on which magnetic members 308 and 308' are fitted. Magnetic signals which are series of N and S poles are recorded with a recording head or the like simultaneously on the magnetic members 308 and 308' on the magnetic recording sections 304 and 304' so that signal tracks are formed on them. Indicated by 305 is a magnetic sensor made up of magnetic resistance effect elements (will be termed "MR elements") R, which is disposed to confront the magnetic recording sections 304 and 304' on the rotary drums 303 and 303' with a small clearance provided between them.

Next, the shape of the rotary drums 303 and 303' will be described with reference to FIG. 35. In the figure, the rotary drums 303 and 303' are in a cup shape having the shaft attachment sections 302 and 302' as mentioned above, with their magnetic recording sections 304 and 304' being made closer to a small gap of Ls. Accordingly, the rotary drums 303 and 303' are fixed with a distance of Ld from each other on the shaft 301 by means of the shaft attachment sections 302 and 302', and this cantilever structure based on the shaft attachment sections 302 and 302' enables the torque detection using the distance Ld. The torque detecting apparatus of this structure has its major features in the formation of the rotary drums in a cup shape and the close disposition of their magnetic recording sections.

Although in FIGS. 34 and 35 the shaft attachment sections 302 and 302', rotary drums 303 and 303', and magnetic recording sections 304 and 304' are structured integrally, the shaft attachment sections 302 and 302' may be separated, by being in a drum shape, from the structure including the rotary drums 303 and 303' and magnetic recording sections 304 and 304'. This structure enables the drum distance Ld to vary arbitrarily without changing the drum dimension. The magnetic recording sections 304 and 304' may also have a separate structure from the rotary drums 303 and 303' and assembled afterward, with the result of the same effectiveness as above.

Figure 37:
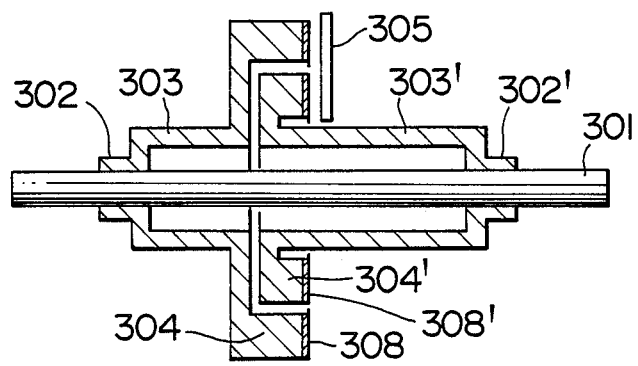

FIG. 37 shows the structure in which the magnetic sensor 305 engages with the rotary drums 303 and 303' on their sides. The magnetic members 308 and 308' on the magnetic recording sections 304 and 304' have their recording surface virtually coincident with the side plane of the rotary drums 303 and 303'.

Figure 38:
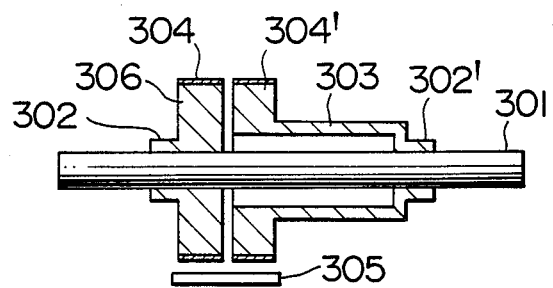

FIG. 38 shows the strucutre of rotary drums, which in this case is the combination of a drum-shape member 306 and a cup-shape member 303 according to this invention. The structure allows the use of an ordinary magnetic encoder drum for the drum-shape member 306, resulting in a reduced manufacturing cost.

Figure 39:
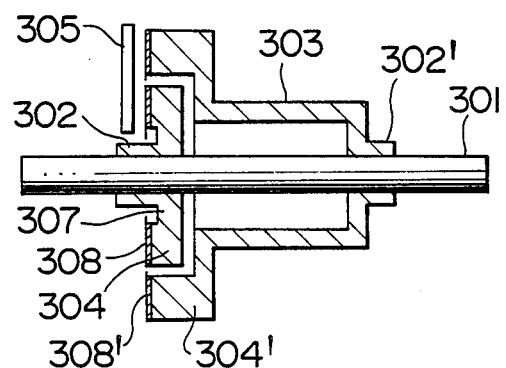

FIG. 39 shows a structure of side disposition for the magnetic sensor 305 as in the case of FIG. 37, with one drum being replaced with a disk-shape member 307, and the same effectiveness as of FIG. 38 is attained.

Figure 40:
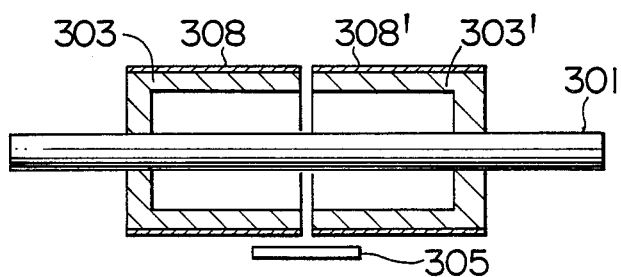

FIG. 40 shows a drum structure, in which the above-mentioned shaft attachment section 302 is removed and the rotary drums are formed of cup-shape members to be press-fitted on the shaft 301. The magnetic members 308 and 308' may be fitted directly on the outer surface of the drum 303, instead of providing a magnetic recording section on it. The magnetic members 308 and 308' may be fitted on only part of the exterior surface, when necessary, without any change in the effectiveness.

Figure 41:
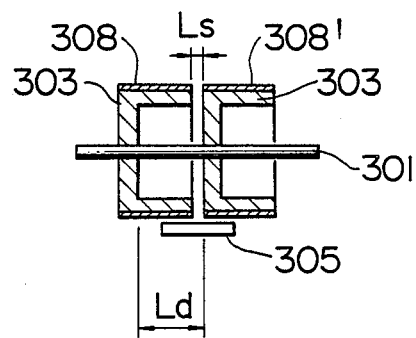

FIG. 41 shows a structure which is suitable for detecting the torque, etc. using a compact, light structure. The measurement of torque is solely based on the shaft diameter and shaft length once the material of shaft is determined, as mentioned previously. Therefore, a shorter and thinner shaft is naturally chosen for a compact, light structure for the small torque measurement. Usual encoders employ bored cup-shape members for their rotary drums in order to reduce the inertia. Such rotary drums can be structured as shown in FIG. 41, and a compact, light, torque measuring apparatus, with the relation of Ld > Ls being retained, is realized. This structure enables the drum to be press-fitted for assembling, and it facilitates a large scale production.

Embodiment 6

Figure 43:
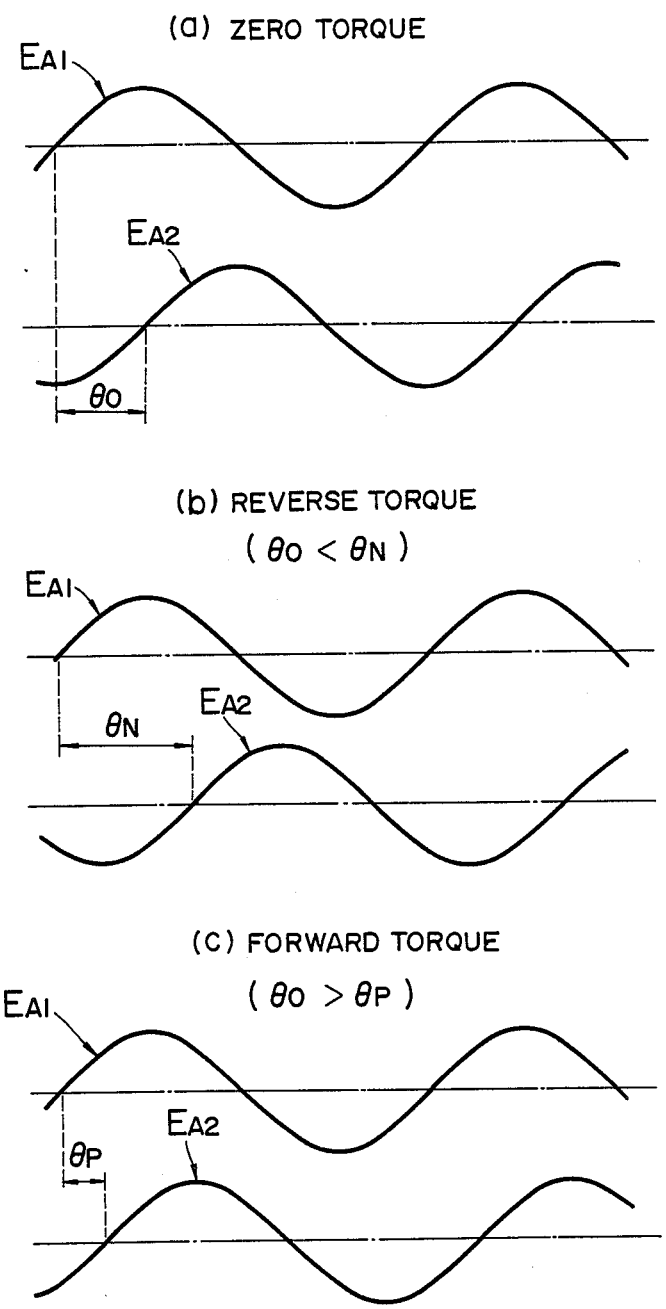

In the preceding embodiments of FIGS. 4, 11 and 34, two groups of MR elements confronting the two drums are disposed virtually in a linear alignment. As a technique for producing output signal waveforms out of phase with each other by 90°, the MR elements R3 and R4 may be disposed with a shift of a quarter recording wavelength λ/4 relative to the MR elements R1 and R2. By this arrangement, the magnetic sensor 4 produces outputs $E_{A1}$ and $E_{A2}$ out of phase by 90° as shown by (a) in FIG. 43, and the polarity of the torque T applied to the shaft which is rotating in one direction can be discriminated by merely examining the magnitude of phase difference $\theta$ with respect to the output $E_{A1}$ for example. In this case if the torque T is applied in the opposite direction, the signals have a phase difference $\theta_N$ larger than the phase difference $\theta_0$ when T=0 shown by (a) in FIG. 43, as shown by (b) in FIG. 43. In the case of a torque in the positive direction applied to the shaft, the signals have a phase difference $\theta_P$ smaller than $\theta_O$ when T=0, as shown by (c) in FIG. 43.

Figure 42:
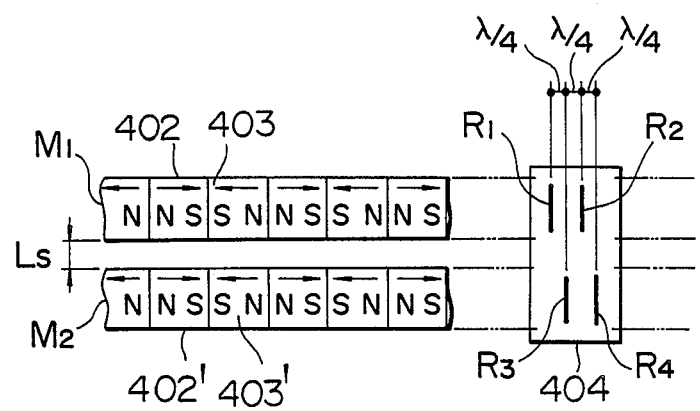

In this case of aligning the MR elements R3 and R4 to the MR elements R1 and R2, respectively, the output signals $E_{A1}$ and $E_{A2}$ are in phase with each other, a recording error or detection error can cause the zero-cross points of signals to move, and the reference signal ($E_{A1}$ or $E_{A2}$) for the measurement of phase difference $\theta$ varies. However, in the embodiment of FIG. 42, the outputs $E_{A1}$ and $E_{A2}$ are made to have a phase difference of 90°, and even in the occurrence of a recording error or detection error, the reference signal ($E_{A1}$ or $E_{A2}$) does not vary, allowing the stable measurement for a small torque. The range of measurement of the torque T is ±90° in terms of the electrical angle of output signal.

Figure 44:
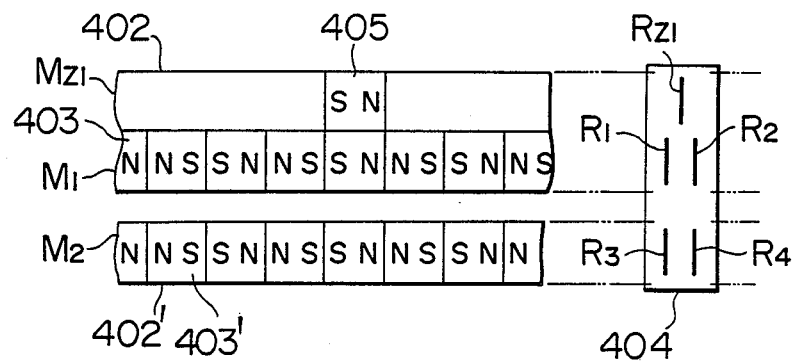

In FIG. 44, one of rotary drums 402 and 402' (drum 402 in this example) is provided with a reference position track $M_{Z1}$ for producing one pulse per revolution as a reference signal 405. An MR element $R_{Z1}$ for the reference position detection is disposed to confront the track $M_{Z1}$ and fabricated integrally with the MR elements R1–R4 in the magnetic sensor 404.

Figure 46:
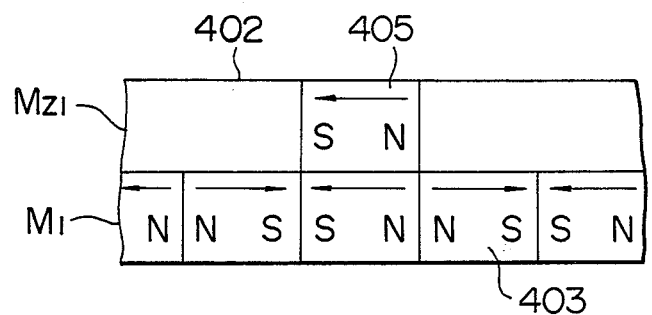
Figure 46:
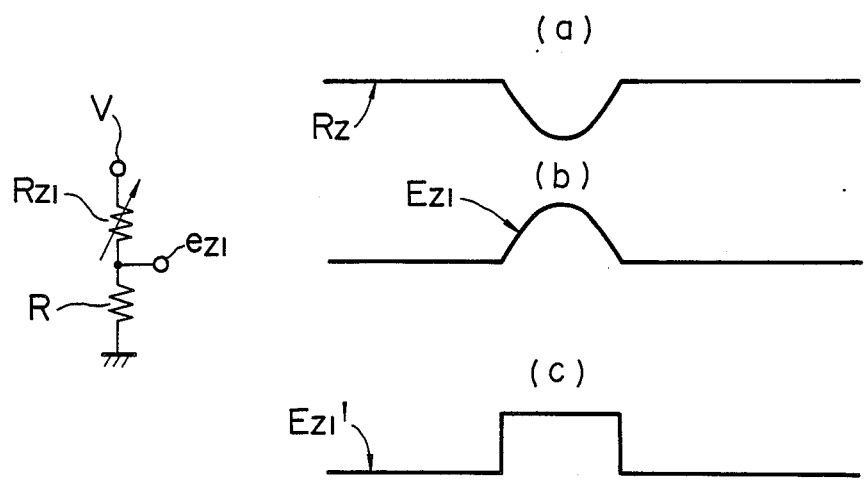

FIG. 46 shows the signal waveforms of this case (the signal track M1 is identical to the preceding case and omitted in the figure). The reference position detecting MR element $R_{Z1}$ is connected with an external resistor or the like to form a 3-terminal configuration, with a voltage V being applied to both ends. As the rotary drum 402 turns and when the reference position signal on the reference position track $M_{Z1}$ has passed the reference position detecting MR element $R_{Z1}$, it varies in resistance as shown by (a) in FIG. 46, resulting in an output voltage $E_{Z1}$ on the output terminal $e_{Z1}$ as shown by (b) in FIG. 46. Generally, the output $E_{Z1}$ is shaped to a rectangular output waveform $E_{Z1}'$ as shown by (c) in FIG. 46 using a comparator or the like, and it facilitates the torque modification, etc. on the basis of the reference position signal $\bar{E}_{Z1}$. Moreover, in case it is used as a torque detector in combination with a motor, etc., it can be used as an origin return signal for motor control. Although the reference position signal is one pulse per revolution in this embodiment, an increased number of pulses may be adopted when necessary.

Figure 45:
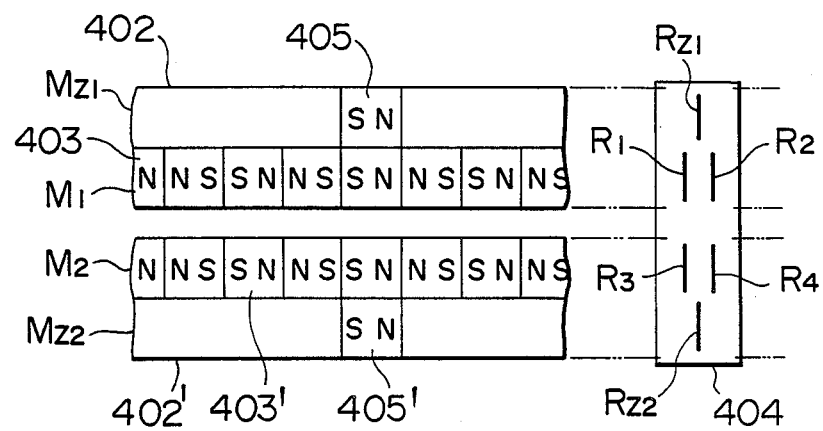

In FIG. 45, both of rotary drums 402 and 402' are provided with reference position tracks $M_{Z1}$ and $M_{Z2}$ and reference position detecting MR elements $R_{Z1}$ and $R_{Z2}$ confronting the tracks $M_{Z1}$ and $M_{Z2}$ formed integrally together with the MR elements R1-R4 in the magnetic sensor 404. This arrangement is capable of detecting the position information accurately on both the load side and motor side, in addiition to the effectiveness of the arrangement shown in FIG. 44. Although in the examples of FIGS. 44 and 45 the signal tracks M1 and M2 are formed on the innermost side of the rotary drums 402 and 402' so that they confront each other in a minimal distance, the signal tracks M1 and M2 and reference signal tracks $M_{Z1}$ and $M_{Z2}$ may have their positions replaced when needed. In such a case, the MR elements R1-R4 and $R_{Z1}$ and $R_{Z2}$ are disposed to confront the signal tracks M1 and M2 and reference signal tracks $M_{Z1}$ and $M_{Z2}$.

Figure 47:
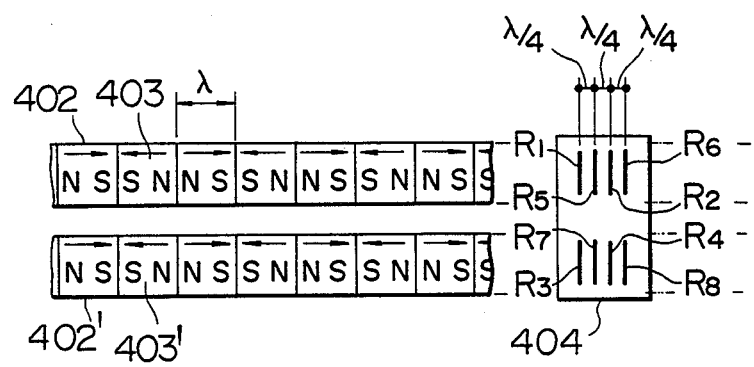
Figure 48:
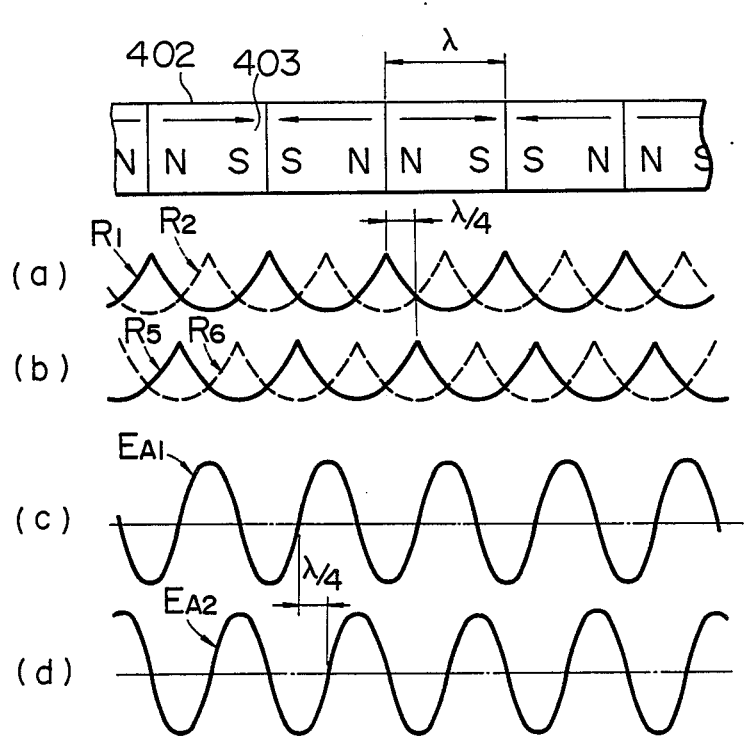

FIG. 47 shows the arrangement which includes MR elements R1 and R2, and R3 and R4 confronting rotary drums 402 and 402', and in addition further MR elements R5 and R6, and R7 and R8 are disposed with a phase shift of quarter recording wavelength λ/4 of magnetic signal, so that 2-phase signals with a virtually 90° phase difference are produced from each of the magnetic signals of the rotary drums 402 and 402'. The signal waveforms pertinent to the rotary drum 402 and MR elements R1, R2, R5 and R6 will be explained on FIG. 48. Shown by (a) and (c) in FIG. 48 are of the same operation as (a) and (b). The additional MR elements R5 and R6 are out of phase with the MR elements R1 and R2 by λ/4, and the MR elements R5 and R6 have their resistance variation on the waveform being out of phase by virtually λ/4 with respect to the resistance variation of the MR elements R1 and R2, as shown by (b) in FIG. 48. By connecting the MR elements R5 and R6 in a 3-terminal configuration (not shown), with a voltage being applied to both ends, the output voltage $E_{A2}$ has a waveform out of phase with $E_{A1}$ by virtually λ/4, as shown by (d) in FIG. 48. By designing the magnetic sensor 4 to provide 2-phase outputs, they can be used for the position detection and speed detection, besides the torque detection. The 2-phase outputs provide more accurate speed information and phase information on both the load side and motor side in a variable load condition. If information on one side (load side or motor side) is already known, only the other side may be provided with 2-phase outputs.

Embodiment 7

Figure 49:
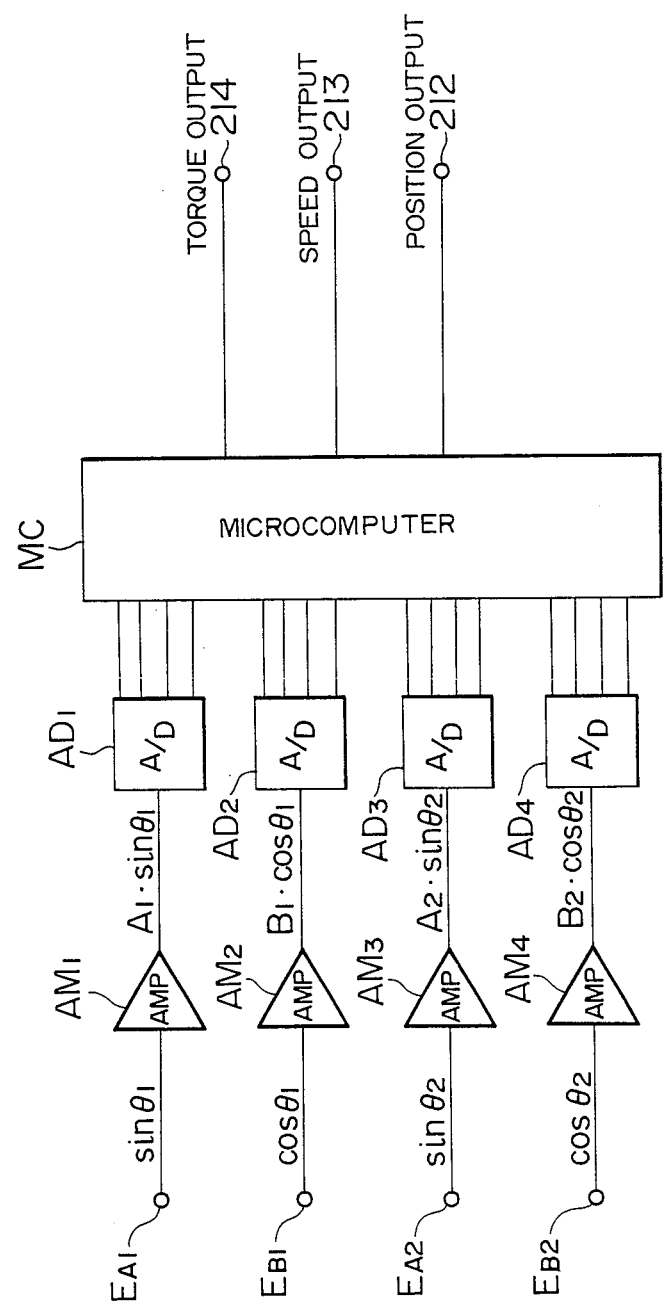
Figure 50:
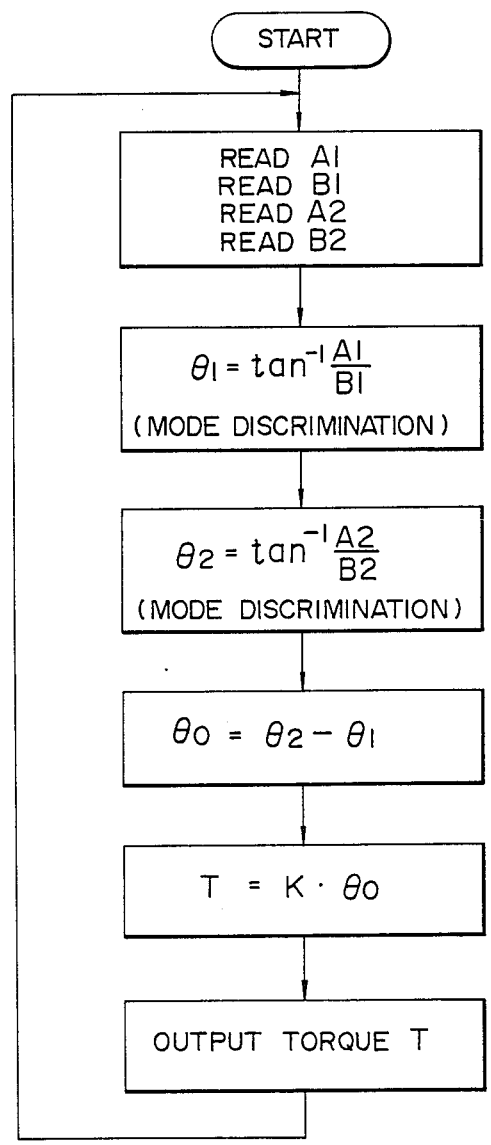

This embodiment is derived from the preceding shown in FIGS. 23 through 33, and a microcomputer is used for the computation. FIGS. 49 and 50 show the computation of torque using a microcomputer from the difference of angles of two rotary drums detected from the sinusoidal outputs of the magnetic sensors. The 2-phase outputs $E_{A2}$ and $E_{B2}$ from the magnetic sensor 204' and the 2-phase outputs $E_{A2}$ and $E_{B2}$ of the magnetic sensor 204' in the system shown in FIG. 31 are introduced to the circuit of FIG. 49. The signals are amplified by amplifiers AM1-AM4, which produce respective outputs $A_1\sin\theta$, $B_1\cos\theta$, $A_2\sin\theta$, and $B_2\cos\theta$. These signals are fed through individual analog-to-digital (A/D) converters AD1-AD4 and introduced to a microcomputer MC. The microcomputer MC implements the arithmetic processings in accordance with the flowchart shown in FIG. 50, and produces an output on a terminal 214 which represents the torque.

The flowchart of FIG. 50 initially reads digital data A1, B1, A2 and B2 derived from the outputs of magnetic sensors 204 and 204' and processed by amplification and A/D conversion. The next step implements the following computation for A1 and B1 to evaluate the angle $\theta_1$ of the rotary drum 202.

$$\theta_1 = \tan^{-1}(A1/B1) \tag{8}$$

At the same time, the polarities of A1 and B1 are examined to discriminate the mode, and the value of $\theta_1$ is determined.

Similarly, the next step calculates the angle 2 of the rotary drum 202' from the inputs A2 and B2 as follows.

$$\theta_2 = \tan^{-1}(A2/B2) \tag{9}$$

The next step calculates the angular difference of the rotary drums 202 and 202', i.e., torsion $\theta_0$, based on the difference of angles $\theta_1$ and $\theta_2$. The next step calcualtes the torque T by the following equation which is a variant of equation (7).

$$T = (\pi \times G \times D^4/32 \times L) \times \theta_0 \tag{10}$$

The last step delivers the value of torque T, and the sequence returns to the first step.

The angle $\theta_1$ calculated by equation (8) can also be obtained solely from A1 or B1 using the following equation (11).

$$\theta_1 = \sin^{-1} A1 = \cos^{-1} B1 \tag{11}$$

However, the division of A1 to B1 as in equation (8) is advantageous for higher accuracy, since variations of outputs A1 and B1, which would occur simultaneusly due to a variation in the clearance between the rotary drum 202 or 202' and the magnetic sensor 204 or 204' cancel each other.

Figure 51:
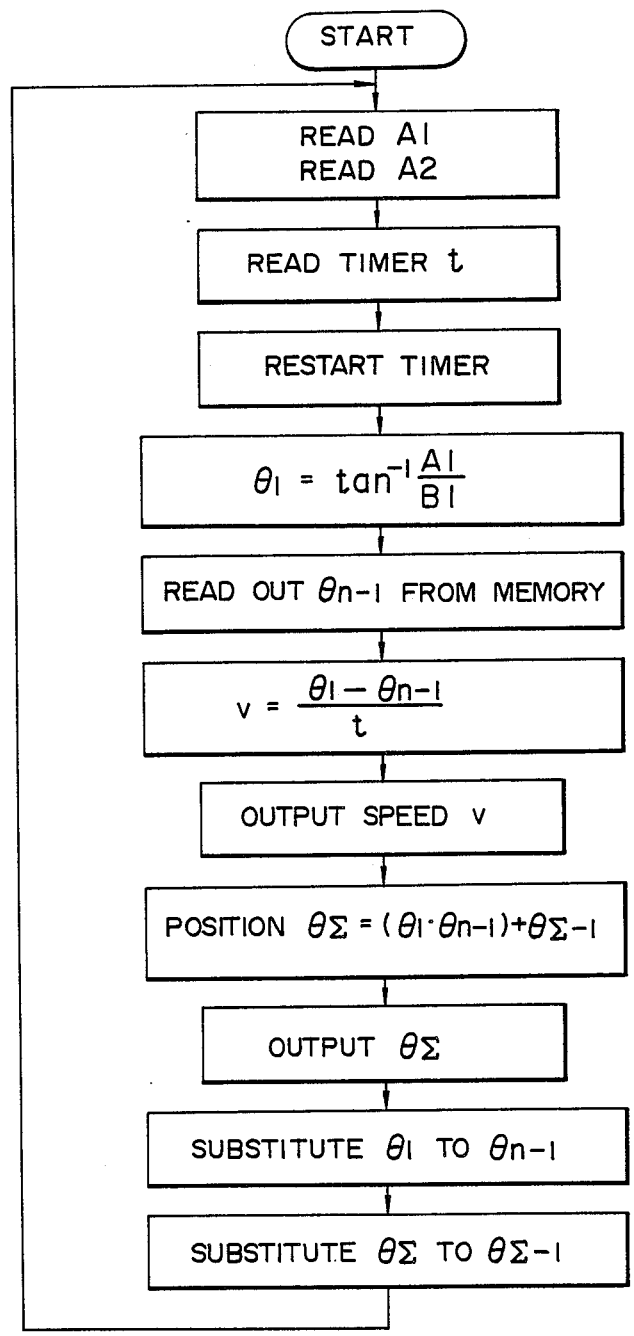

FIG. 51 is the flowchart for calculating the rotational position and rotational speed. The program initially reads the sinusoidal digital inputs A1 and B1, reads time t for the speed measuring timer, and, after it is held temporarily, starts the timer. Next, the program calculates a small angle $\theta_1$ within a cycle using equation (8) in the same way as torque detection. Next, the program reads the previous small angle $\theta_{n-1}$ out of the memory and calculates the difference from the new angle $\theta_1$ to evaluate the angular difference $\theta_{n-1} - \theta_1$. By dividing the result with the time difference t between the previous and current events, the speed v is evaluated and it is delivered to the output terminal 213. For the calculation of position, the difference between the current small angle $\theta_1$ and previous small angle $\theta_{n-1}$ is added by the cumulative angle up to the previous event $\theta_{\Sigma-1}$, and the resulting current angle $\theta_\Sigma$ is delivered to the output terminal 212. Next, the current small angle $\theta_1$ is stored in the memory location for $\theta_{n-1}$ and the current angle $\theta_\Sigma$ is stored in the memory location for the previous angle $\theta_{\Sigma-1}$, and the program returns to the beginning. These are the example when the small angle $\theta_1$ and previous small angle $\theta_{n-1}$ are within a cycle, and in case of variation over one cycle, the angle cumulation is used for calculation.

These are the case when the magnetic sensors 204 and 204' provide sinusoidal outputs. A technique for producing the sinusoidal outputs will be explained on FIG. 52. The magnetic sensor 204 has its magnetic resistance effect elements (MR elements) $R_{a1}$ and $R_{a2}$, and $R_{b1}$ and $R_{b2}$ disposed with a half recording wavelength $\lambda/2$, with a $\lambda/6$ spacing between $R_{a1}$ and $R_{b1}$ and between $R_{a2}$ and $R_{b2}$. The MR elements are connected as shown in the figure, and the MR elements $R_{a1}$ and $R_{a2}$ produce an output $e_a$ as shown by the solid line $e_a$ as the rotary drum 202 rotates. The waveform is distorted due to the saturation of resistance variation of MR elements against the magnetic field. The distorted waveform has a main component of the third harmonic, and the original waveform can be separated into a fundamental wave $e_{a1}$ and third harmonic $e_{a3}$ as shown by the dashed line in the figure. Similarly, the MR elements $R_{b1}$ and $R_{b2}$ provide an output $e_b$, which is separated into a fundamental wave $e_{b1}$ and third harmonic $e_{b3}$. As a bridge output $E_{A1}$, i.e., $e_a + e_b$, the third harmonics $e_{a3}$ and $e_{b3}$ having opposite phases cancel each other, leaving the fundamental wave.

Although in this embodiment the rotary drums 202 and 202', and magnetic sensors 204 and 204' are fitted externally on the shaft 201 of the motor 206, the rotary drums 202 and 202', and magnetic sensors 204 and 204' may be built inside the motor 206.

According to the structure of this embodiment, the torque detecting apparatus is constructed by rotary drums having magnetic members on which magnetic signals are recorded and a magnetic sensor which is an array of MR elements to produce sinusoidal outputs, and the torque can be detected accurately even in a stoppage. The magnetic sensor has its output magnitude constant irrespective of revolutions, and the processing circuit is made simple. The use of magnetism is advantageous against environmental concerns such as dusts and dews, whereby a highly reliable torque detecting apparatus is realized.

Embodiment 8

Figure 52:
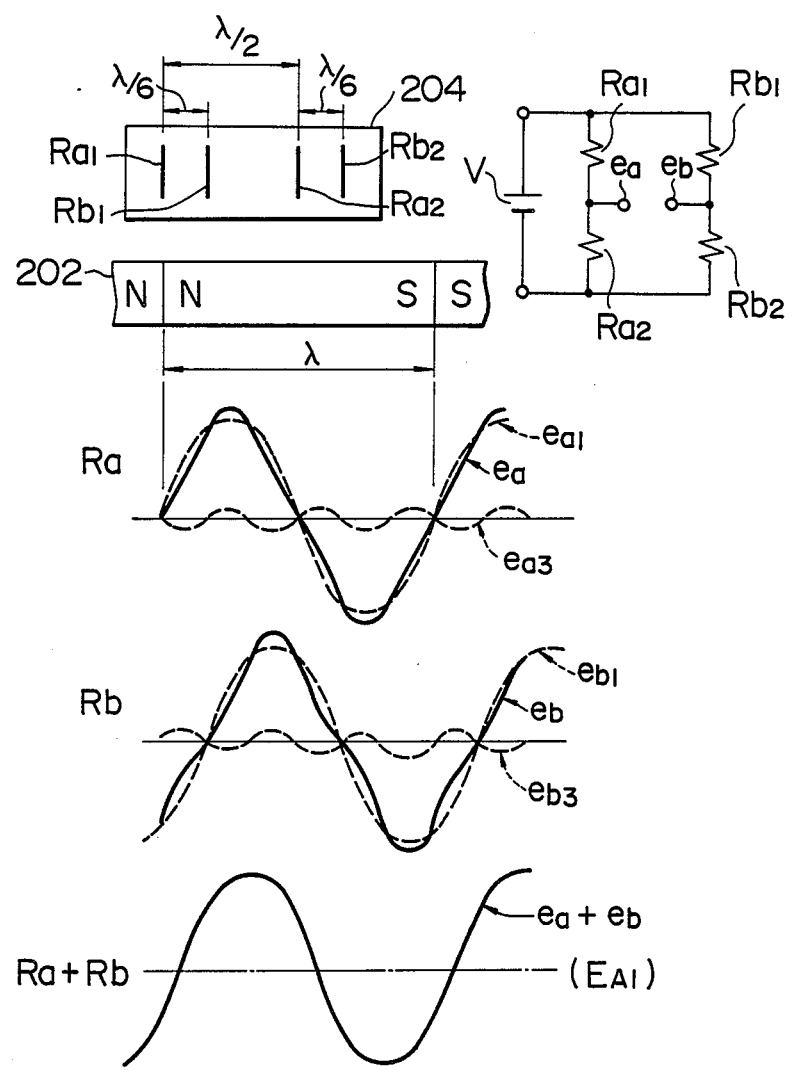
Figure 53:
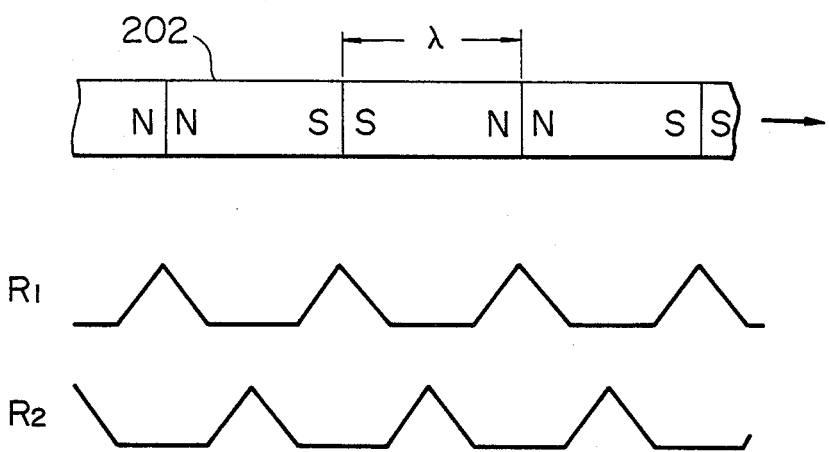
FIGS. 53, 54, 55(A) and 55(B) are diagrams showing the eighth embodiment of this invention which produces a triangular signal waveform.
Figure 54:
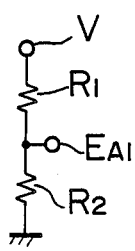

The foregoing various embodiments have been based on the assumption that the magnetic sensor provides sinusoidal outputs. However, actual magnetic sensors have their outputs including many odd-numbered harmonics due to the saturation of resistance variation of the magnetic resistance effect elements (MR elements), and sinusoidal outputs are difficult to obtain unless it is devised as shown in FIG. 52. In the dispostion of the rotary drum 202 and magnetic sensor 204 as shown in FIGS. 24 and 25, when the magnetic signal recorded on the rotary drum 202 and the clearance between the rotary drum 202 and magnetic sensor 204 are chosen appropriately so that the MR elements R1 and R2 have their resistance variation saturated, the waveform of resistance variation of the MR elements R1 and R2 as shown in FIG. 53 results. The MR elements are so connected as shown in FIG. 54 that their output $E_{A1}$ has a triangular waveform as shown by (A) in FIG. 55. The triangular wave varies in linear against the magnetic signal of the rotary drum, i.e., one-to-one correspondence between the rotational angle and the analog value of output $E_{A1}$, making the angle detection shown in FIG. 32 accurate. Similarly, the magnetic drum 202' provides the output $E_{A2}$ as shown by (B) in FIG. 55, and it facilitates the detection of angles from the outputs of both magnetic sensors 204 and 204'.

According to the structure of this embodiment, the torque detecting apparatus is constructed by rotary drums having magnetic members on which magnetic signals are recorded and a magnetic sensor which is an array of MR elements to produce triangular outputs, and the torque can be detected accurately even in a stoppage situation. The magnetic sensor has its output magnitude constant irrespective of revolutions, and the processing circuit is made simple. The use of magnetism is advantageous against environmental concerns such as dusts and dews, whereby a highly reliable torque detecting apparatus is realized.

Embodiment 9

In the foregoing embodiments, the magnetic sensor provides sinusoidal outputs, or if not, signals are produced as close to a sinusoidal wave as possible, as shown in FIG. 52, or rectangular waves are produced as shown in FIG. 53 for the torque detection.

On the other hand, by storing in a memory device the waveform of output signals produced by a magnetic sensor in use, it becomes possible to detect the angle on the basis of comparison between the stored waveform and actually produced output signal, and the need of shaping the magnetic sensor output into a prescribed waveform is eliminated.

Figure 55:
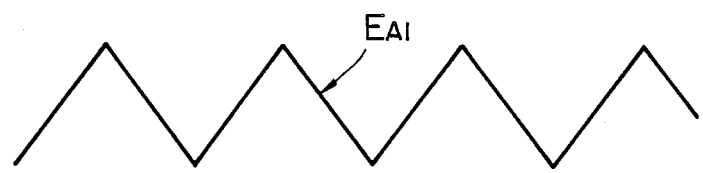
Figure 55:
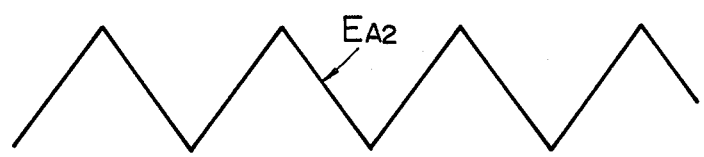
Figure 56:
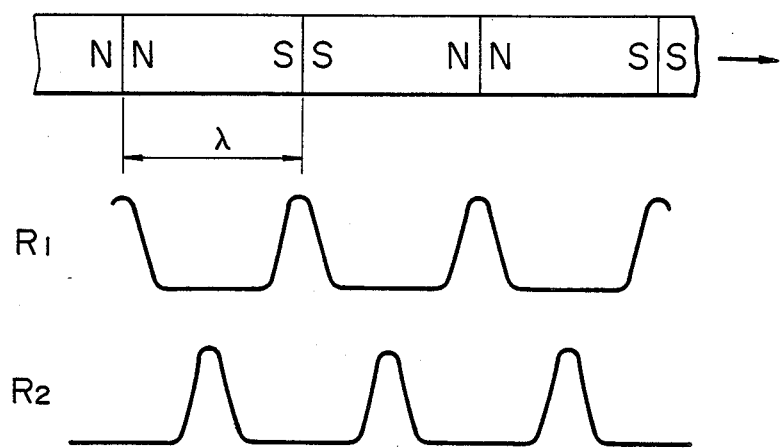
Figure 57:
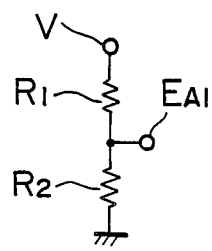
Figure 58:
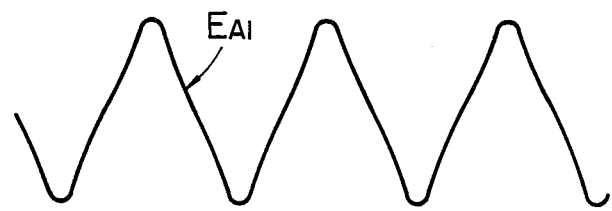
Figure 58:
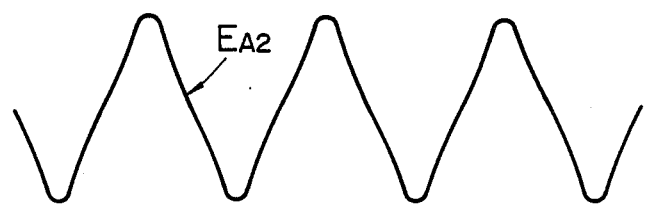

Actual output waveforms produced by magnetic sensors are distorted due to inclusion of many harmonics in many cases. The following gives a most practical embodiment which makes use of a distorted wave. FIG. 54 shows a typical resistance variation of magnetic resistance effect elements (MR elements) in the magnetic sensors 204 and 204' which is saturated by the magnetic field of the rotary drum 202. The MR elements R1 and R2 are connected as shown in FIG. 55, with their output voltage $E_{A1}$ being distorted as shown by (A) in FIG. 56. Similarly, the rotary drum 202' and magnetic sensor 204' have their output $E_{A2}$ distorted as shown by (B) in FIG. 56. The analog value of the distorted wave has not a unique relation with the angle of rotary drum, as opposed to the case of a sinusoidal wave.

FIG. 59 shows a technique for evaluating the angle of rotary drum from the distorted waveform. The magnetic sensors 204 and 204' produce 2-phase outputs with a 90° phase difference. The signals are fed through amplifiers AM1–AM4 to analog-to-digital converters AD1–AD4, and resulting digital outputs are fed to the address input of read-only memories (ROMs) RO1—RO4. The ROMs are provided in advance with a record of the relation between the magnitude of analog waveform and the angle obtained through the analysis of output waveforms from the magnetic sensors 204 and 204'. Namely, the ROMs modify the input signals so that their magnitude is in a linear proportional relationship with the angle. The outputs of the ROMs RO1—RO4 are introduced to the microcomputer MC, which calculates angles for the inputs, and further calculates the torque T from the angular difference $\theta_0$ using the following equation.

$$T=(\pi \times G \times D^4/32 \times L) \times \theta_0$$

The microcomputer MC further calculates the angle of each rotary drum or the drum speed from a change in angle on the time axis. The embodiment allows the magnetic sensors 204 and 204' to provide arbitrary distorted waveforms, and yet achieves accurate torque detection.

According to this embodiment, the output waveforms of the magnetic sensors are analyzed and the relation between the waveform analog value and the angle is stored in the memory in advance, and therefore the waveform of magnetic sensor is not limited to a sinusoidal or triangular wave, although the memory contents need to be modified if a significant error arises between the stored waveform and the output waveform provided by the magnetic sensor.

We claim:

1. A torque detecting apparatus comprising:
a driving shaft and a driven shaft connected coaxially with said driving shaft by a torsion bar;
a first drum fitted on said driving shaft and a second drum fitted on said driven shaft;
magnetic signals recorded on the surface of said first and second drums; and
a magnetic sensor for detecting the rotational angles of said first and second drums in a non-contact manner, said apparatus detecting a torque from a difference of rotational angles of said first and second drums, wherein said driving shaft and driven shaft are connected at free end portions thereof by a coupling bearing so that said shafts are allowed to have a relative rotation, and wherein said first and second drums are fitted on the external circumference of free ends of said driving shaft and driven shaft.

2. A torque detecting apparatus according to claim 1, wherein said driving shaft and driven shaft have cylindrical portions on which said drums are fitted.

3. A torque detecting apparatus comprising rotary members, with magnetic members of a plurality of poles being provided thereon, fitted on both ends of a torsion bar; electromagnetic transducer elements disposed to confront said rotary members for detecting a relative displacement of said magnetic members; and a signal processing circuit for measuring a torque from a signal detected by said electromagnetic transducer elements, said signal processing circuit comprising a waveform shaping circuit which produces pulses in response to the rotation of the magnetic members of one rotary member on the basis of the signal detected by said electromagnetic transducer elements, a differential voltage detecting circuit which produces a differential voltage from a relative displacement of both rotary members on the basis of the signal detected by said electromagnetic transducer elements, and an arithmetic circuit which evaluates a rotational angle and torque on the basis of signals provided by said circuits.

4. A torque detecting apparatus designed to detect a torque transmitted along a certain rotary shaft and applied to the control of an assisting torque to be added to the torque output side of said rotary shaft in response to the result of detection, said apparatus comprising:
a non-contact sensor means comprising magnetic resistance effect elements for detecting said torque and producing a output waveform indicative thereof;
a sensor signal processing means mounted on a base for processing said output waveform of said non-contact sensor means; and
an electronic control means for controlling said assisting torque based on an output of said sensor signal processing means, said electronic control means being formed integrally with said sensor means and said sensor signal processing means as one control unit and fitted on a fixture for supporting said rotary shaft.

5. A torque assisting apparatus according to claim 4, wherein said no-contact sensor means comprises a first and second magnetic drums fitted on the torque input side and torque output side of said rotary shaft, and first and second magnetic detecting elements for detecting magnetically rotational angular positions of said first and second magnetic drums as a sine value and cosine value of sinusoidal signals, rotational angles of said first and second magnetic drums being calculated from an arctangential value which is a ratio of the sine value to cosine value of said signal, said torque being detected as a difference of rotational angles of said first and second magnetic drums.

6. A torque assisting apparatus according to claim 4, wherein said rotary shaft comprises a steering wheel shaft of an automobile, said assisting torque acting as an assisting steering force.

7. A torque assisting apparatus according to claim 6, wherein said automobile has a rack-and-pinion steering system, an assisting steering force to a pinion of said steering system being transmitted, through a bevel gear, from an electric motor having a rotary shaft substantially parallel to the sliding direction of a rack.

8. A torque detecting apparatus for detecting a load torque from a relative angular difference of angles detected by angle detectors fitted at a certain interval on a shaft rotated by a drive source, said apparatus comprising two rotary drums or rotary discs with a plurality of magnetic poles for generating magnetic signals being provided on the surface thereof, and magnetic sensors disposed to confront said surface of said rotary drums or discs, with magnetic resistance effect elements which varies in internal resistance in response to the magnetism of said magnetic poles being provided thereon, a relative angular position of said rotary drums or rotary discs being taken out as a resistance variation of said magnetic resistance effect elements.

9. A torque detecting apparatus according to claim 8, wherein an amount of torsion on said rotary shaft created by a load on the load side of said rotary shaft is measured as a phase difference of outputs of said magnetic sensors and converted into an angular difference between both magnetic drums or magnetic discs, and a torque is detected on the basis of the angular difference.

10. A torque detecting apparatus according to claim 8, wherein a magnetic sensor output produced by at least one magnetic drum or magnetic disc comprises a multi-phase output, said output being divided into a plurality of modes, measuring methods of phase difference of magnetic sensor outputs being switched in accordance with said modes.

11. A torque detecting apparatus according to claim 8, wherein the phase difference of magnetic sensor outputs is taken out as a time interval.

12. A torque detecting apparatus according to claim 8, wherein the output signal of the magnetic sensor on the load side is used for position detection besides torque detection.

13. A torque detecting apparatus according to claim 8, wherein the output signal of the magnetic sensor on the drive side is used for position detection besides torque detection.

14. A torque detecting apparatus according to claim 8, wherein the magnetic sensor output signal is switched for position detection between the load side and drive side depending on the operational state.

15. A torque detecting apparatus according to claim 8, wherein the magnetic sensors on the load side and drive side are summed or subtracted from each other to produce a position detection signal.

16. A torque detecting apparatus comprising a plurality of rotary drums fitted with a certain spacing on the drive side and load side of a rotary shaft, with signal tracks with a record of magnetic signals being formed on the surface thereof, and magnetic resistance effect elements disposed on a fixed portion which confront each of said drums, a relative displacement created by a torsion of rotational axis between said rotary drums being taken out as a resistance variation of said magnetic resistance effect elements, wherein one of said rotary drums is formed in a cup shape, and wherein said drums are fitted on said rotary shaft to meet a relation of Ld>Ls where Ld is a distance between positions on the shaft where said drums are fitted and Ls is a distance between the signal tracks, and wherein said plurality of magnetic resistance effect elements for detecting the magnetic signals on both rotary drums are formed by evaporative deposition or etching on a single substrate to form a single-chip magnetic sensor.

17. A torque detecting apparatus comprising a plurality of angle detectors fitted with a certain spacing on a rotational shaft which connects a load with a drive source and operates to detect a load torque from a relative angular difference of angles detected by said angle detectors, said apparatus comprising a plurality of rotary drums or rotary discs fitted with a certain spacing on the drive side and load side of said rotary shaft, with a plurality of magnetic poles for generating magnetic signals being formed on the surface thereof, and a magnetic sensor disposed to confront said surface of said rotary drums or discs, with magnetic resistance effect elements which vary in internal resistance in response to the magnetism of said magnetic poles being provided thereon, said magnetic sensor producing two sets of outputs with a virtually sinusoidal waveform in correspondence to angles of said rotary drums or discs, an angular difference of the two set of sinusoidal outputs being calculated to detect a torque.

18. A torque detecting apparatus according to claim 17, wherein each set of said sinusoidal outputs comprises multi-phase outputs having different phases.

19. A torque detecting apparatus according to claim 18, wherein said multi-phase outputs are used to calculate angles.

20. A torque detecting apparatus according to claim 17, wherein the angular difference between said plurality of rotary drums or discs, with a maximum torque being applied, is within one cycle of sinusoidal output.

21. A torque detecting apparatus according to claim 17, wherein one cycle of the sinusoidal output is divided into a plurality of modes for implementing the angle calculation.

22. A torque detecting apparatus according to claim 17, wherein said magnetic sensor has output signals evaluating through calculation the position or speed of said rotary shaft besides the torque detection.

23. A torque detecting apparatus comprising a plurality of angle detectors fitted with a certain spacing on a rotational shaft which connects a load with a drive source and operates to detect a load torque from a relative angular difference of angles detected by said angle detectors, said apparatus comprising a plurality of rotary drums or rotary discs fitted with a certain spacing on the drive side and load side of said rotary shaft, with a plurality of magnetic poles for generating magnetic signals being formed on the surface thereof, and a magnetic sensor disposed to confront said surface of said rotary drums or discs, with magnetic resistance effect elements which vary in internal resistance in response to the magnetism of said magnetic poles being provided thereon, said magnetic sensor producing two sets of outputs with a virtually triangular waveform in correspondence to angles of said rotary drums or discs, an angular difference of the two sets of triangular outputs being calculated to detect a torque.

24. A torque detecting apparatus according to claim 23, wherein each set of said outputs comprises multi-phase outputs having different phases.

25. A torque detecting apparatus according to claim 24, wherein said multi-phase outputs are used to calculate angles.

26. A torque detecting apparatus according to claim 23, wherein the angular difference between said plurality of rotary drums or discs, with a maximum torque being applied, is within one cycle of the output.

27. A torque detecting apparatus according to claim 23, wherein one cycle of the output is divided into a plurality of modes for implementing the angle calculation.

28. A torque detecting apparatus according to claim 23, wherein said magnetic sensor has output signals evaluating through calculation the position or speed of said rotary shaft besides the torque detection.

29. A torque detecting apparatus comprising a plurality of angle detectors fitted with a certain spacing on a rotational shaft which connects a load with a drive source and operates to detect a load torque from a relative angular difference of angles detected by said angle detectors, said apparatus comprising a plurality of rotary drums or rotary discs fitted with a certain spacing on the drive side and load side of said rotary shaft, with a plurality of magnetic poles for generating magnetic signals being formed on the surface thereof, and a magnetic sensor disposed to confront said surface of said rotary drums or discs, with magnetic resistance effect elements which vary in internal resistance in response to the magnetism of said magnetic poles being provided thereon, said magnetic sensor producing two sets of outputs in correspondence to angles of said rotary drums or discs, and apparatus further comprising a ROM (memory) which stores angles corresponding to the waveform of the outputs, the angular difference of the two sets of outputs being calculated from the output of said ROM.

30. A torque detecting apparatus according to claim 29, wherein each set of said outputs comprises multi-phase outputs having different phases.

31. A torque detecting apparatus according to claim 29, wherein said multi-phase outputs are used to calculate the angle.

32. A torque detecting apparatus according to claim 29, wherein the angular difference between said plurality of rotary drums or discs, with a maximum torque being applied, is within one cycle of the triangular wave output.

33. A torque detecting apparatus according to claim 29, wherein one cycle of the triangular wave output is divided into a plurality of modes for implementing the angle calculation.

34. A torque detecting apparatus according to claim 29, wherein said magnetic sensor has output signals evaluating through calculation the position or speed of said rotary shaft besides the torque detection.

35. A torque detecting apparatus according to claim 4, wherein said base comprises a sensor support of an assist motor.

* * * * *